(12) United States Patent
Schieder et al.

(10) Patent No.: US 7,082,103 B2
(45) Date of Patent: Jul. 25, 2006

(54) SUBSCRIBER TERMINAL, NETWORK CONTROLLER AND COMMUNICATION SYSTEM FOR PERFORMING PACKET DATA TRANSFER WITH REDUCED DELAY

(75) Inventors: Andreas Schieder, Herzogenrath (DE); Tobias Ley, Aachen (DE); Uwe Horn, Aachen (DE); Michael Meyer, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 829 days.

(21) Appl. No.: 09/809,071

(22) Filed: Mar. 16, 2001

(65) Prior Publication Data

US 2001/0026546 A1 Oct. 4, 2001

(30) Foreign Application Priority Data

Mar. 31, 2000 (EP) .................................. 00106925

(51) Int. Cl.
*G01R 31/08* (2006.01)
(52) U.S. Cl. .................... 370/231; 709/224; 455/343.4
(58) Field of Classification Search ................ 370/229, 370/335
See application file for complete search history.

(56) References Cited

U.S. PATENT DOCUMENTS 5,708,656 A * 1/1998 Noneman et al. ........... 370/335
5,745,695 A 4/1998 Gilchrist et al.
6,377,790 B1 * 4/2002 Ishii ......................... 455/343.1
6,741,556 B1 * 5/2004 Seddigh et al. ............. 370/229
6,760,303 B1 * 7/2004 Brouwer .................... 370/229

FOREIGN PATENT DOCUMENTS

WO 98/52325 11/1998
WO 00/01173 1/2000

OTHER PUBLICATIONS

International Search Report and Written Opinion mailed Jun. 6, 2001 in corresponding PCT application PCT/EP01/03372.
International Preliminary Examination Report mailed Jul. 11, 2002 in corresponding PCT Application No. PCT/EP01/03372.

(Continued)

Primary Examiner—Phirin Sam
Assistant Examiner—Robert W. Wilson
(74) Attorney, Agent, or Firm—Nixon & Vanderhye, P.C.

(57) ABSTRACT

In a communication system (SYS) in which a packet data transfer is performed between the network side (NS) and the subscriber terminal side (SS) a physical connection (LC) is maintained during the data packet transfer. An active period detector (AP-DET) detects an active period of data packet generation by evaluating the inter-arrival time (TDIFF) between successively arriving data packets (DP). If the inter-arrival time (TDIFF) falls within a predetermined range a physical connection maintaining device (LC-MAIN) maintains the physical connection (LC) even if a transmitter queue (TR-QUE) temporarily becomes empty. Therefore, within the active period (AP) the transmitter (NS-TR; SS-TR) indicates a non-empty queue. The invention finds particular application in the GPRS/(E)GPRS/GSM environment.

30 Claims, 14 Drawing Sheets

PRINCIPLE OF THE INVENTION

OTHER PUBLICATIONS

European Standard (Telecommunications Series) ETSI EN 301 344 V7.3.0, Digital Cellular Telecommunications System (Phase 2+); General Packet Radio Service (GPRS); Service Description; Stage 2 (GSM 03.60 version 7.3.0 Release 1998) (Dec. 1999).

European Standard (Telecommunications Series) GSM 04.60 V8.2.0, Digital Cellular Telecommunications System (Phase 2+); General Packet Radio Service (GPRS); Mobile Station (MS)—Base Station System (BSS) Interface; Radio Link Controll/Medium Access Control (RLC/MAC) Protocol (GSM 04.60 version 8.2.0 Release 1999) (Dec. 1999).

* cited by examiner

GPRS NETWORK ARCHITECTURE

GPRS PROTOCOL STRUCTURE

SCHEMATIC EXAMPLE OF TBF HANDLING PROBLEM

G.723.1 TYPICAL TRAFFIC SHAPE

NORMAL RESOURCE ASSIGNMENT RESULTING INTO UNNECESSARY TBF RELEASE

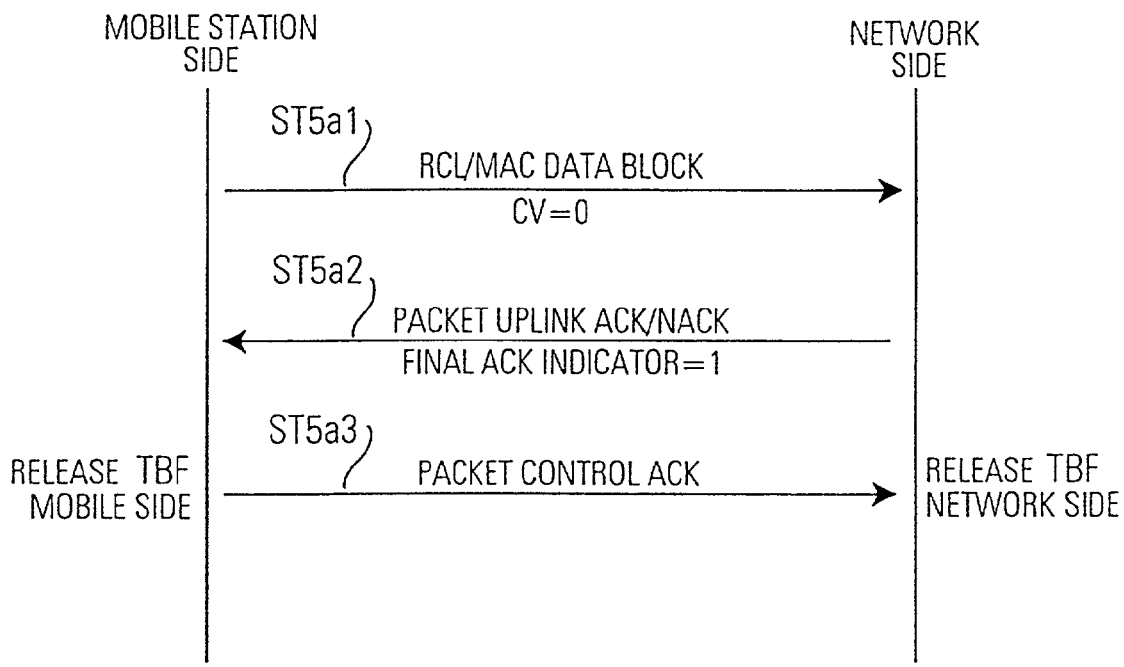

RELEASE OF A DOWNLINK TBF

TYPICAL DELAY IMPROVEMENTS GAINED BY UTILISING THE DELAYED TBF RELEASE SCHEME- SIMULATIVE RESULTS

PRINCIPLE OF THE INVENTION

PRINCIPLE OF THE INVENTION

DELAYED TBF RELEASE (DOWNLINK)

TBF TERMINATION BY UTILISING (E)GPRS SIGNALLING MESSAGES (DOWNLINK)

SUBSCRIBER TERMINAL, NETWORK CONTROLLER AND COMMUNICATION SYSTEM FOR PERFORMING PACKET DATA TRANSFER WITH REDUCED DELAY

FIELD OF THE INVENTION

The invention relates to a subscriber terminal, a network controller and a communication system for performing a packet data transfer on a connection between a subscriber terminal side and a network side. The communication system can comprise only a packet data communication system or a packet data communication system connected to a circuit switched communication system.

In such a communication system a physical connection is maintained during a data packet transfer. A physical connection in principle indicates in the subscriber terminal side and in the network side that the subscriber terminal and the network side are valid for performing a packet data transfer. A data packet transfer can only be performed if the physical connection is established.

The present invention in particular addresses the problem to determine and evaluate appropriate conditions for maintaining or terminating the physical connection.

BACKGROUND OF THE INVENTION

Although the invention is of course not limited to any particular type of communication system comprising a packet data communication network or a circuit switched communication network and a packet switched communication network in combination, the background of the invention can most be easily understood by reference to the GPRS (General Packet Radio Service) system in GSM (Global System for Mobile Communication). GPRS is a new packet switched service which is standardized by ETSI.

As shown in FIG. 1, a communication system SYS incorporating a GPRS network architecture comprises for the conventional circuit switched mobile communication network the well-known entities of e.g. a mobile switching centre MSC, a base transceiver station BTS, a base station controller BSC, a home location register HLR etc. wherein the mobile switching MSC may be connected to a conventional public switched telephone network PSTN.

The GPRS architecture (illustrated with grey shading) introduces new packet switching functionalities in the existing GSM architecture. According to the GSM specifications a new node SGSN (SGSN: Serving GPRS Support Node) is provided which is interfaced via interfaces Gb, Gs, Gr with the base station controller BSC, the mobile switching centre MSC and the home location register HLR. Via the SGSN node an IP backbone network can be accessible in the conventional mobile communication network. By means of additional nodes GGSN (GGSN: Gateway GPRS Support Node) an IP network or X.25 network can for example be connected to the IP backbone network.

In FIG. 1 the dotted lines denote an exchange of signalling messages, the dashed lines denote a circuit switched connection and the solid lines denote a packet switched connection.

The existing GSM data services (9.6 k-bit/s packet switched) and a newly standardized High Speech Circuit Switched Data HSCSD and GPRS with data rates up to 114 k-bit/s are based on a Gaussian Minimum Shift Keying (GMSK) Modulation Scheme. To be able to have even higher bit rates a 8-Phase Shift-Keying (PSK) modulation scheme is introduced with an advanced standard, called the EDGE standard, which can boost the available data rate up to 384 k-bit/s (EDGE: enhanced Data Rate for GSM Evolution). A new extension called EGPRS (Enhanced General Packet Radio System) is considered as the migration from the second generation mobile network to the third generation Wideband Code Division Multiplex Access (WCDMA) networks. As shown in FIG. 1, GPRS provides a packet switched transmission service to transport data in a mobile environment. This packet oriented data service for GSM supports protocols like X.25 and IP as level 3 protocols and therefore is suitable to work as air link for the access to the IP based Internet. Another advantage in respect of Internet application in the mobile communication network via GPRS is that a packet oriented service no longer needs a costly online connection (i.e. an available online connection) applying time based charging but enables volume based charging.

In the system in FIG. 1 the aim is that the communication system SYS shall be able to support all existing applications via packet switched links, including voice and video but should also support application with bursty traffic, such as Internet applications whose bursty nature requires efficient multiplexing on the GSM time slot (TS). The idea is to build a unified network based on IP providing service flexibility and independence of applications and the network.

In particular due to the time critical nature of speech it is important to meet the tight quality of service requirements of real time traffic. For example, in real time applications as VoIP (Voice over Internet Protocol) over GPRS and EGPRS, the end-to-end delay time of the transfer of data packets is an important aspect, since for example a high delay time might sound like a speech pause at the receiving end. Therefore, in particular for real time applications special provisions regarding the maximum delay time must be made.

Protocol Structure

In FIG. 2 the GPRS protocol structure for the communication network SYS in FIG. 1 is shown. MS is the protocol stack of the mobile station or subscriber terminal, more generally of a communication station. BSS is the base station system and SGSN and GGSN are the same nodes as explained above with reference to FIG. 1. It should be noted that a full description of this protocol structure is contained in the ETSI standard GSM 3.60 and hereinafter only those portions of the protocol structure are explained which are relevant for the present invention.

As shown in FIG. 2 the medium access layer MAC and the radio link layer RLC operate above the physical link layer. The MAC layer provides the multiplexing of several mobile stations MS on the time slot structure of GSM. The MAC layer arbitrates multiple mobile stations attempting to allocate resources and transmitting simultaneously. The operations of the MAC functions allow a single mobile station to use more than one time slot (TS) simultaneously. The number of allowed parallelly used time slots TS in a single TDMA frame is determined by the time slot capabilities of the mobile station. Hereinafter, these capabilities are called "multislot capability". Each mobile station is thus given a certain amount of time slots TS for use, ranging from multislot capability 1 (only 1 time slot TS) up to multislot capability 8 (all 8 time slots TS in the TDMA frame).

The GRPRS MAC layer is responsible for providing efficient multiplexing of data and control signalling on the uplink and downlink connections. The multiplexing on the downlink is controlled by so-called downlink scheduler which has knowledge of the active mobile stations in the system and of the downlink traffic. Therefore, an efficient multiplexing on the timeslots TS can be made. On the uplink, the multiplexing is controlled by medium allocation to individual users. This is done by resource requests, which are sent by the mobile station to the network which then has to schedule the time slot TS on the uplink.

The GPRS RLC function provides the interface towards the LLC (LLC: Logical Link Control) layer, especially the segmentation and re-assembly of LLC-PDUs (PDU: Packet Data Units) into RLC data blocks depending on the used coding scheme (CS).

The procedures of the medium access layer MAC in the mobile station (communication station) on the terminal side and the base station system BSS on the network side NS include the provision of a physical connection which is called the Temporary Block Flow TBF in GPRS. A temporary Block Flow (TBF) is a physical connection used by the two RR peer entities to support the unidirectional transfer of LLC packet data units (PDUs) on packet data physical channels. The TBF is allocated radio resources on one or more packet data channels PDCHs and comprises a number of RLC/MAC blocks carrying one or more LLC PDUs. A TBF is temporary and is maintained only for the duration of the data transfer (i.e. until there are no more RLC/MAC blocks to be transmitted and in RLC acknowledgement mode, all of the transmitted RLC/MAC blocks have been successfully acknowledged by the receiving entity). The physical connection TBF is assigned a temporary flow identifier (TFI) by the network side NS to associate the mobile station MS with the current physical connection TBF.

For example, an uplink state flag (USF) is used by the network side NS (i.e. the network scheduler) to control the multiplexing of the different mobile stations on the uplink connection (for the packet transfer). The uplink state flag USF is included in the header of each RLC PDU packet on the downlink connection (Packet Data Channel PDCH). The uplink state flag USF indicates the owner of the corresponding uplink data packet (radio block). The mobile station MS which has the identity indicated in the USF field is allowed to transmit a RLC block (data packet) in the uplink direction on the same time slot TS on which it has received the radio block with the corresponding uplink state flag USF.

Thus, the physical connection is used to organize the access of the radio resources. A mobile station MS having a valid TBF is therefore included in the GPRS scheduling mechanism and can expect to get access to the radio resources according to its signalled multislot capabilities. Thus, the physical connection indicates in the subscriber terminal (mobile station) and in the network side (base station system BSS) that the subscriber terminal and the network side are valid for performing a packet data transfer. Via this physical connection the subscriber terminal side and the network side know that the subscriber terminal (mobile station or communication station) should be included in the GPRS timeslot (radio resources) scheduling. Thus, via the physical connection a context is generated in the subscriber terminal side and the network side which indicates the subscriber terminal and network side as being included in the packet data communication system radio resources scheduling process. This context or physical connection is only maintained during the data packet transfer and is terminated as soon as a packet data transfer stops.

Real Time Application (Voice Coder)

There are applications like real-time applications, which are sensitive against delays occurring during the end-to-end data packet transfer. In particular, this applies to voice coding (a real time application), without being limited to it.

With increasing processing power it became beneficial to compress voice/audio information before sending it to the subscriber terminal or the network side. This is especially true for transmission of speech/audio over wireless channels because transmission costs are much higher than computing costs in this environment. Nowadays, many different coders have been employed and are in use. Most of these coders generate a constant bit rate traffic (CBR) and produce data packets at typical and well defined regular intervals. The coder standard G.723.1 may serve as a typical example of the coders. Data packets containing compressed speech information are produced with inter-arrival times TDIFF of 30 ms and the data packets are typically 24 bytes in size.

A coder on the transmitting subscriber terminal side SS or the network side NS may use a silence detector to avoid generating packets during speech pauses. When the silence detector detects a silence period it sends a silence insertion descriptor SID as shown in FIG. 4b in order to indicate the silence period. In the silence period no data packets are generated. The silence insertion descriptor SID is also used to define the comfort noise level generated at the receiver site during the silence period. FIG. 4b shows a typical packet stream produced by such a coder according to G.723.1.

Of course, it depends on the coding standard used whether or not a silence insertion descriptor SID is send by the coder. That is, other coders may prefer not to insert a silence insertion descriptor in which case the silence periods are indicated to the receiver site differently.

In principle, the typical traffic shape shown in FIG. 4b can be generated by a coder or any real time application RTA connected or incorporated into the mobile station as shown in FIG. 3.

Transmission Queue TR-QUE

The data packets as generated in FIG. 4a by a real time coder for speech (or in fact by any other application connected to or incorporated into the mobile station MS) is transmitted by the subscriber terminal side or the network side from a transmission buffer containing a transmission queue TR-QUE illustrated in FIG. 3. As shown in FIG. 4a, the data packets DP1, DP2, DP3 . . . DPn are successively transmitted to the network side or subscriber terminal side from this transmitter queue TR-QUE. However, when transmitting encoded speech data packets/audio data packets over GPRS/EGPRS there is a certain threat that the systems behaves poorly due to the frequent and unnecessary releases of the physical connection TBF, even during active periods of a speaker. The inventors have discovered such a problem during their studies of experimental systems and simulations.

A reason for the frequent release of the physical connection TBF is the behaviour of GPRS focussing on a transmission of large application packet data units PDUs such as complete web-pages or simply the content of a TCP window (TCP: Transfer Control Protocol). For such applications which quickly and continuously generate data packets, the transmitter queue TR-QUE is likely to be filled and the individual data packets are successively transmitted whilst the physical connection TBF is not interrupted. In contrast to that, in the case of audio/speech transmission over (E)GPRS the transmitter queue TR-QUE is still constantly filled with small data packets from the application (the speech coder). For the case of the G.723.1 standard speech coder, an application packet enters the (E)GPRS transmitter queue TR-QUE every 30 ms. That is, for such a coder the inter-arrival time is typically 30 ms.

However, if the packet is transmitted from the queue in a shorter time than 30 ms, the transmitter queue TR-QUE is emptied (e.g. the queue shown in FIG. 4c is emptied) and in such a case the GPRS physical connection release procedures as shown in FIGS. 5a, 5b are immediately started. This leads especially for high-end terminals (high multislot capability) to the unwanted effect of frequent physical connection releases and establishments. In such a case the application and end-user would experience an unnecessary high end-to-end delay and furthermore, of course the repeated release and establishment of the physical connection TBF entails a heavy signalling load during the TBF handling.

FIG. 6 shows the end-to-end delay [ms] when different numbers of mobile stations MS simultaneously transmit packet data in the communication system SYS. As designated with the curves 8MS, 9MS, 10MS, 11MS there is a large end-to-end delay for prior art solutions. The inventors have discovered the problem that this high-end-to-end delay during the data packet transmission is due to frequent TBF releases. Since the TBF releases have been recognized as the core problem of the invention, hereinafter with reference to FIGS. 5a, 5b and FIG. 4c the procedure for uplink and downlink TBF release will be explained with more detail. It should also be noted that of course these release and establishment procedures for a physical connection are by no means limited to the real time application data packet patterns since a TBF release will start whenever an empty queue in the transmitter is detected, independent from the fact whether the data packets are generated by a real time application or any other application.

Physical Connection Release

As explained above, the establishment of physical connection TBF is done by using the signalling channels of GPRS. This means that a demand for a physical connection TBF needs to be signalled in the worst case on the random access channel. In general, the establishment of a physical connection TBF takes a certain time and occupies a signalling capacity in the communication system. The GPRS standard does not define exactly the conditions when a physical connection TBF has to be established and released. However, the method to perform the establishment and release procedures have been defined quite clearly.

Thus, with reference to FIG. 5a and FIG. 3 the release procedure for an uplink physical connection TBF is described. The subscriber terminal side comprises a subscriber terminal side transmitter queue monitoring device QUE-MON for determining whether the transmitter queue TR-QUE comprises data packets DP to be transmitted (see FIG. 4a). Furthermore, the subscriber terminal side comprises a transmitter queue information setting means CV-SET for determining on the basis of the determination made by the transmitter queue monitoring means QUE-MON a transmitter queue information CV indicating whether the transmitter queue is empty (CV=0) or whether the transmitter queue TR-QUE contains at least one remaining data packet to be transmitted to the network side (CV>0). The subscriber terminal side transmitter SS-TR transmits to the network side NS data packets DP from the transmitter queue TR-QUE and transmits in association with the respective data packet DP the determined transmitter queue information CV. The transmitter queue information CV can be transmitted in the respective packet DP as shown in FIG. 5a and FIG. 4c. However, it is of course sufficient to link the transmission of the data packet to the transmission of the respective transmitter queue information CV. Thus, every RLC/MAC data block sent from the subscriber terminal side to the network side contains the transmitter queue information CV (which hereinafter will also be referred to as counter value CV field). Usually this counter value field CV is transmitted in the header and is used to signal the number of remaining RLC packets in the transmitter queue TR-QUE. FIG. 4c shows one example of the usage of the counter value CV field for a mobile station handling 2 time slots in a TDMA frame. As can be seen from FIG. 4c, for each transferred data packet a respective counter value field CV is determined, i.e. in FIG. 4c CV=2 for the first data packet (PDU) and CV=1 for the second packet (PDU)).

According to the ETSI standard GSM 04.60 V8.2.0 standard the transmitter terminal side transmitter queue information setting means CV-SET sets as said transmitter queue information CV a counter value CV determined in accordance with the following expression:

Integer $x=\text{roundup}\ ((TBC-BSN'-1)/NTS)$ $CV=x$, if $x<=BS\_CV\_MAX$ 15, otherwise where:
CV: counter value inserted in each data packet DP before transmission;
TBC: total number of data packets DP present in the transmitter queue TR-QUE;
NTS: transmission resources RES defined as a number of time slots (multislot capability NTS) in a single frame used for data packets DP transferred on the uplink connection with range 1 to 8;
BSN': absolute block sequence number of the RLC data block with range from 0 to (TBC-1);
BS_CV_MAX: a parameter broadcast in the system information; and
roundup: rounds upwards to the nearest integer.

According to the standard, once a mobile station MS transmits a value of CV other than 15, the mobile station shall transmit exactly (TBC-BSN'-1) not transmitted RLC data blocks. In other words, a countdown procedure is started, which leads to the release of the physical connection TBF. In particular, in context with real-time applications, this can cause an unnecessary release of the physical connection TBF and therefore can introduce an unnecessary delay. Any data that arrives from the higher layer after the commencement of the countdown process shall be sent within a future physical countdown TBF.

Also without focusing on the countdown procedure, the normal resource assignment results in an unnecessary physical connection TBF release as shown in FIG. 4c. The transmitter queue information setting means CV-SET always determines at a certain time the number of data packets which remain when the present data packet is transmitted to the network side. Since for example in step ST4c1 the network side transmission resource scheduler SCH-RES had assigned two time slots 2TS (because the mobile station is a multislot capability 2 mobile station) the first data packet transferred in step ST4c2 receives a counter value CV=2 (CV=roundup [(4−1)/2]=roundup [1.5]=2). Likewise, the second data packet receives a counter value of CV=1 (CV=roundup [(3−1)/2]=roundup [0.5]=1.0. The assignment of two timeslots and the transmission of data slots with the respectively calculated counter value CV is continued in FIG. 4c in steps ST4c3, ST4c4, ST4c5 and ST4c6. In FIG. 4c a multislot capability 2 mobile station and an application generating a new data packet every 30 ms was assumed. However, also for the general case the calculation of the counter value CV and the transmission of the data packets is the same. That is, in a multislot capability× transmission maximum×timeslots are used for transmission as assigned beforehand by the network side NS and each of the x data packets have a corresponding counter value CV.

Furthermore, it should be noted that of course the transmission of the data packets by using timeslots can also be different. For example, each data packet can be distributed over the plurality of timeslots and can be reassembled on the network side NS. Still, after reassembly in the network side NS the respective counter value CV will indicate whether there are any further packets in the transmitter queue TR-QUE or not.

As shown in FIG. 5a, for the release of an uplink physical connection TBF, at a certain stage in step ST5a1 a RLC/MAC data packet containing a counter value CV=0 will be transmitted to the network side. The counter value CV=0 in a packet clearly indicates an empty queue to the network side after transmission, i.e. CV=0 indicates that there are no further "remaining" data packets in the queue after the transmission of the data packet containing CV=0. In this case the network side will first transmit a so-called packet uplink acknowledgement/negative acknowledgement message in step ST5a2 incorporating a final acknowledgement indicator=1 to the subscriber terminal side. The message in step ST5a2 is to indicate to the subscriber terminal side that the network side has understood that no further data packets are residing in the subscriber terminal side transmitter queue and that an uplink TBF release procedure is to be started. In step ST5a3 the mobile side sends a packet control acknowledgement message to the network side after releasing the physical connection TBF on the mobile side. Finally, after receiving the message in step ST5a3 the network side performs the release of the physical connection on the network side. As can clearly be seen, a certain time is needed to release or terminate the physical connection for the uplink and furthermore signalling resources are occupied in the network.

FIG. 5b shows the steps for the release of a downlink physical connection TBF. The procedure of a downlink physical connection release in FIG. 5b is also indicated with steps ST5a2, ST5a3 in FIG. 4c. As can be seen from FIG. 3, also the network side has a network side transmitter queue TR-QUE, a network side transmitter queue monitoring device QUE-MON, a network side transmitter queue information setting means FBI-SET and a network side transmitter NS-TR performing the same functions as the corresponding devices in the mobile station MS. However, the network side does not indicate to the terminal side the exact number of remaining data packets, i.e. the network side transmitter queue information setting means only determines a transmitter queue information FBI which indicates whether the transmitter queue TR-QUE is empty, FBI=1 or whether the transmitter queue TR-QUE contains at least one data packet to be transmitted to the terminal side, FBI=1. When the subscriber terminal side receives the message in step ST5b1 containing the final block indicator field FBI=1, then this indicates the occurrence of the last/final block of the current physical connection TBF. After successful reception of this RLC packet with FBI=1, the mobile side performs the physical connection release and sends an acknowledgement message to the network side in step ST5b2. Then the network side performs the release of the physical connection. As can be seen from FIG. 5b, also for the release of the downlink physical connection TBF time is necessary and signalling resources are used.

SUMMARY

As explained above, during a data packet transfer between the subscriber terminal side and the network side several conditions may occur which lead to the transmission of a transmitter queue information to the respective other side indicating an empty queue in the respective transmitter queue TR-QUE. This results in frequent releases of the physical connection with the subsequent need of additional signalling to rebuild the physical connection whenever new data packets are available in the transmitter queue.

There may be many reasons why the transmitter queue becomes empty, i.e. if the removal rate of the data packets from the transmitter queue varies and is potentially higher than the rate of the arriving packets (see FIG. 4a). As shown in FIG. 4c, another condition which may lead to a physical connection release is if too many packets are taken away from the transmitter queue if for example in a multislot capability 2 mobile station two time slots (transmission resources) are assigned and only two packets are available in the transmitter queue. During the next data packet transfer to the network side, using two time slots on the uplink, the transmitter queue TR-QUE thus becomes empty leading to a corresponding indication CV=0 which starts the physical connection release procedure. Even when a next packet arrives (as the packet arriving at the dot-dashed line in FIG. 4c) there will first be a physical connection release and thereafter immediately a physical connection establishment due to the new data packet. Such frequent establishment and release of physical connection drastically increase the end-to-end delays as shown in FIG. 6.

The inventors have discovered that the increased end-to-end delay during a data packet transmission is due to the fact that conditions in the subscriber terminal side or the network side may lead to frequent physical connection establishment and release procedures consuming time and signalling capacity.

Therefore, the object of the present invention is to provide a subscriber terminal, a network controller, a method, and a communication system in which unnecessary physical connection releases during a data packet transfer between the subscriber terminal side and the network side are avoided and the delay time is reduced.

This object is solved by a subscriber terminal (claim 1) of a communication system for performing packet data transfer on a connection between the subscriber terminal side and a network side, wherein during a data packet transfer a physical connection is maintained which indicates in the subscriber terminal and the network side that the subscriber terminal and the network side are capable of performing said packet data transfer characterized by a transmission detector including an active period detector for monitoring, during a data packet transfer from said subscriber terminal side to said network side, the inter-arrival time of data packets and for determining as an active period the period from a first data packet to a last data packet for which each monitored inter-arrival time falls in a predetermined range; and a physical connection controller including a physical connection maintaining device for maintaining said physical connection between said subscriber terminal side and said network side in said active period.

Furthermore, the object is solved by a network controller (claim 11) of a communication system for performing packet data transfer on a connection between a subscriber terminal side and a network side, wherein during a data packet transfer a physical connection is maintained which indicates in the subscriber terminal and the network side that the subscriber terminal and the network side are capable of performing said packet data transfer, characterized by a transmission detector including an active period detector for monitoring, during a data packet transfer from said network side to said subscriber terminal side, the inter-arrival time of data packets and for determining as an active period the period from a first data packet to a last data packet for which each monitored inter-arrival time falls in a predetermined range; and a physical connection controller including a physical connection maintaining device for maintaining said physical connection between said subscriber terminal side and said network side in said active period.

Furthermore, the object of the present invention is also solved by a method (claim 22) for performing in a communication system a packet data transfer on a connection between a subscriber terminal side and a network side, comprising the following steps: maintaining during a data packet transfer on said connection a physical connection which indicates in the subscriber terminal and the network side that the subscriber terminal and the network side are capable of performing said packet data transfer, characterized by the following steps: monitoring, during a data packet transfer from said subscriber terminal side to said network side, the inter-arrival time of data packets and determining as an active period the period from a first data packet to a last data packet for which each monitored inter-arrival time falls in a predetermined range; and wherein said physical connection between said subscriber terminal side and said network side is maintained in said active period.

Furthermore, the object is also solved by a communication system comprising at least one subscriber terminal and/or at least one network controller as defined above.

According to the invention an active period detector is provided for monitoring the inter-arrival time of data packets to determine an active period as long as the inter-arrival time remains within a predetermined time range. By doing so the subscriber terminal side or the network side can recognize whether or not an active period of data packet arrival/transfer is present. As long as the inter-arrival time remains below a certain limit, the network side or subscriber terminal side can therefore safely assume that there is a continuous arrival of data packets e.g. from a real-time application connected to or incorporated into the subscriber terminal or from an application from another party on the network side. In such a determined active period where all inter-arrival times are within a predetermined range, the physical connection maintaining device maintains the physical connection.

Preferably, the active period detector is further adapted for detecting silence periods in which no data packets for data packet transfer are available when a physical connection terminator is provided for terminating the physical connection during the detected silence period.

Preferably, the active period detector can detect a silence period on the basis of a silence insertion descriptor. Preferably, the active period detector comprises a real-time application data detector for detecting whether said data packets are real-time data packets. For doing so, the real-time application data detector can evaluate the pattern of the arriving data packets, preferably the packet length and/or the packet arrival rate.

Furthermore, the active period detector can detect whether the data packets are real-time data packets by evaluating signalling information between the application and the transmission entity.

Preferably, a data packet transmission delay device can delay the transmission of a data packet at least for the inter-arrival time as monitored by the active period detector. Thus, it can always be insured that the transmission queue does not become empty.

Preferably, the subscriber terminal can comprise a timer for counting the inter-arrival time when a data packet is transmitted and, if no new data packet entry in the transmitter queue is determined in the counted inter-arrival time, the subscriber terminal side transmitter can transmit a special data packet and a transmitter queue information indicating that a transmitter queue is empty. That is, only after a predetermined time corresponding to the inter-arrival time the empty queue indication is sent to make sure that indeed no further data packets have arrived in the inter-arrival time requiring a transmission.

Preferably, the special data packet transmitted with the empty transmitter queue indication is the last sent data packet, i.e. the last sent packet (e.g. buffered in memory) is repeated. Further preferably, the data packet sent with the empty queue indication can be an empty packet (dummy packet).

Preferably, if the timer is incorporated on the network side and the entry of a new data packet in the network side transmitter queue is not detected after the expiration of the timer, instead of sending the special data packet, the network side can also transmit a signalling message to the subscriber terminal side and in association therewith a transmitter queue information indicating that the network side transmitter is empty. That is, the final transfer data can also be a signalling message.

Further preferably, the subscriber terminal can comprise an uplink release acknowledgment message detector for determining the receipt of an uplink release acknowledgment message which is transmitted from the network side in response to receiving a transmitter queue information from the subscriber terminal indicating that the transmitter queue is empty. When the subscriber terminal transmitter queue monitoring means detects the entry of a new data packet in the subscriber terminal transmitter queue after sending a transmitter information indicating that the transmitter queue is empty, a detected uplink release acknowledgment message will not be answered by the subscriber terminal by transmitting an uplink release confirmation message but by transmitting the newly entered data packet. Thus, even when the release procedure for the physical connection is already under way this release procedure can be stopped by not sending back the confirmation message but a new data packet.

Furthermore, the above described devices and procedures for maintaining the physical connection can be incorporated only on the subscriber terminal side, only on the network side or on both the subscriber terminal side and the network side. In the latter case, this leads to a further improved maintaining of the physical connection.

Further advantageous embodiments and improvements of the invention can be taken from the other dependent claims. Furthermore, it should be noted that the invention is not restricted to the examples and embodiments described in the description and claimed in the claims. In particular, the present invention comprises embodiments which result from a combination of features and/or steps which have been separately described and/or claimed.

Therefore, the skilled person can carry out variations and modifications at the teaching disclosed here and all such modifications and variations are considered to fall within the scope of the present invention.

BRIEF DESCRIPTION OF THE DRAWINGS

FIG. 5a shows the release of an uplink physical connection according to the prior art;

Figure 1:
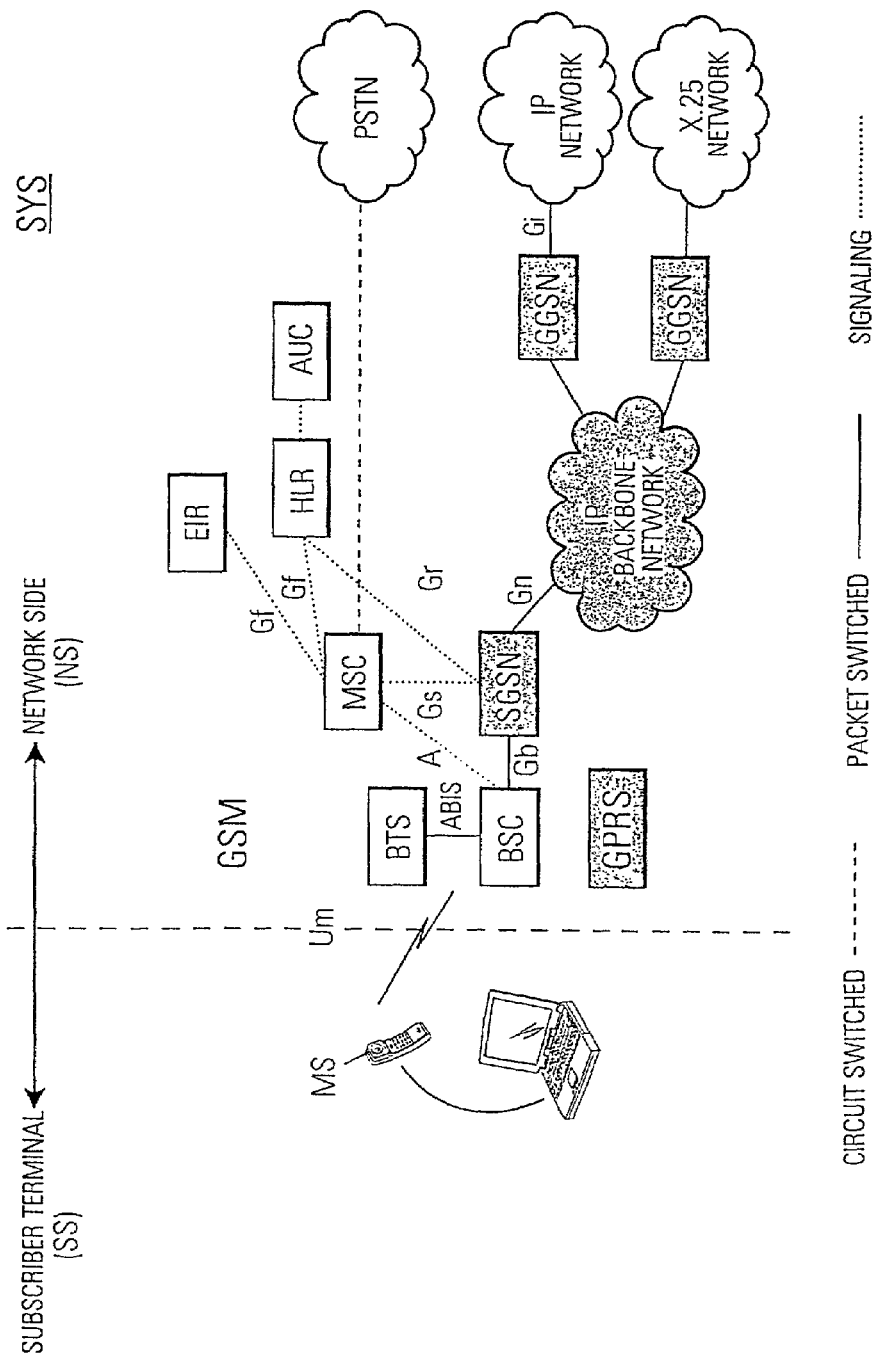
FIG. 1 shows a principal overview of a GPRS network architecture.
Figure 2:
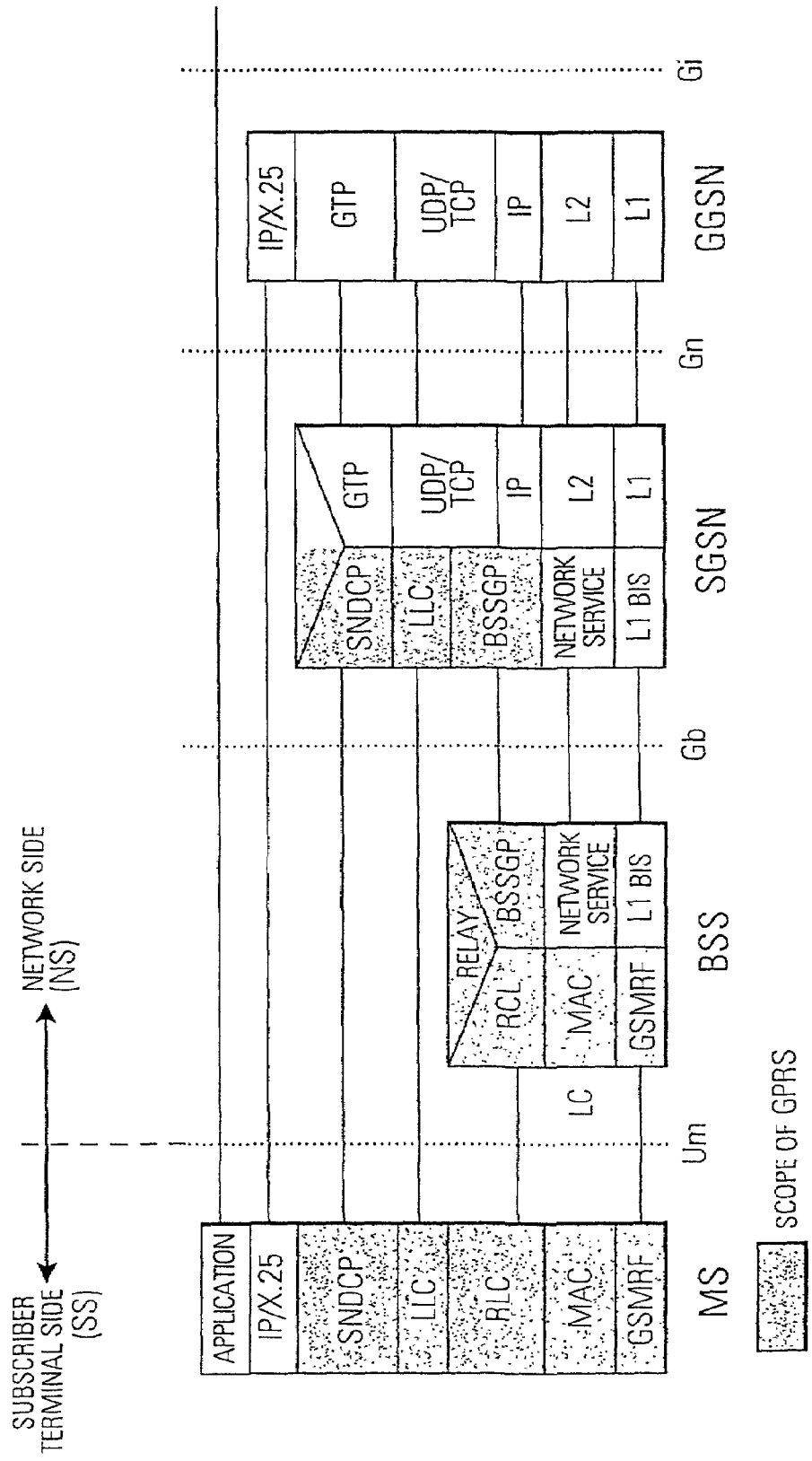
FIG. 2 shows a typical GPRS protocol structure.

In the drawings the same or similar reference numerals denote the same or similar steps and parts throughout. However, it should be also noted that the invention can comprise embodiments which consists of combinations of the respective flowcharts and block diagrams and that the invention is not limited to a separate consideration of the separately described and illustrated embodiments.

PRINCIPLE OF THE INVENTION

Figure 3:
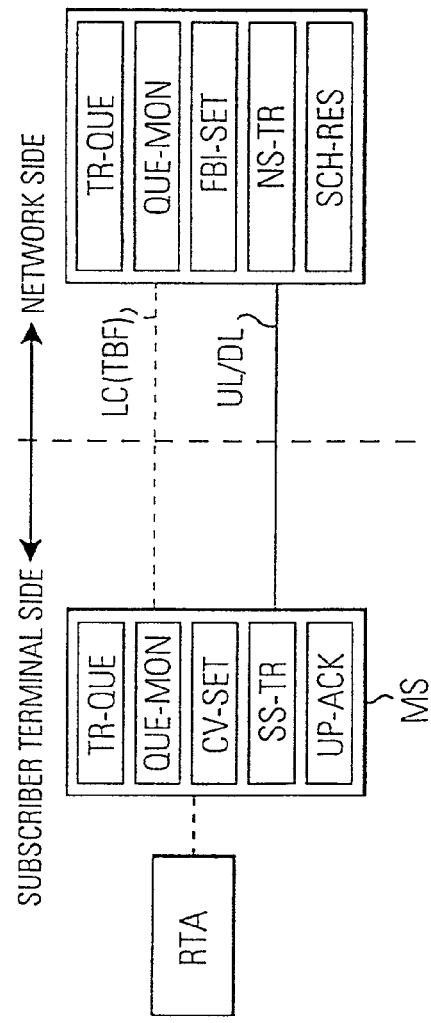
FIG. 3 shows a subscriber terminal side and a network side in accordance with the prior art.
Figure 7:
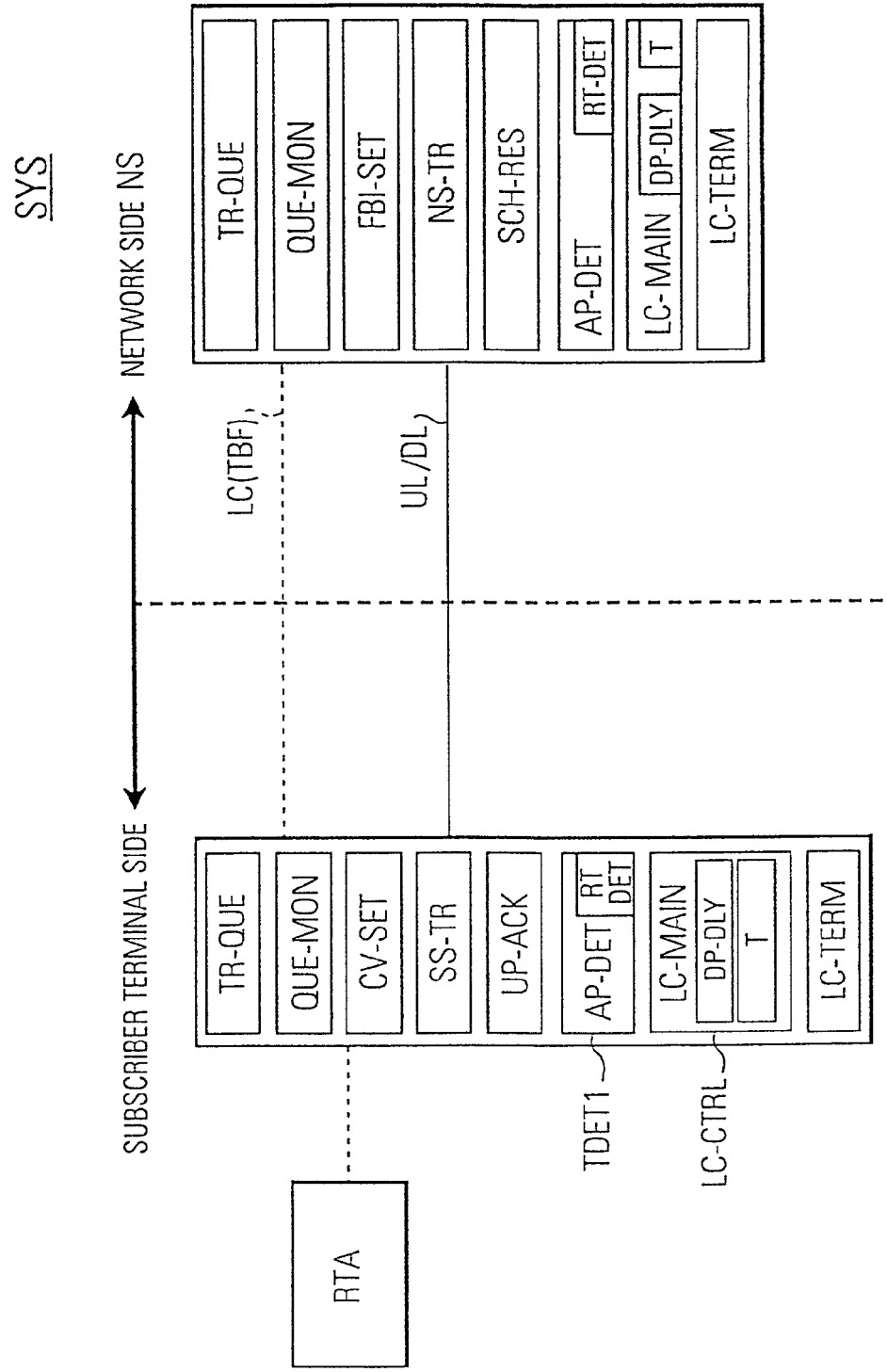
FIG. 7 shows a principal block diagram of a subscriber terminal side and a network side according to the principle of the invention.

FIG. 7 shows a principle block diagram of the functionalities incorporated on the network side and the subscriber terminal side according to the embodiments of the invention. In addition to the devices already explained with reference to FIG. 3, the mobile station (in general a communication station) on the subscriber terminal side additionally comprises a transmission detector including an active period detector AP-DET for monitoring during a data packet transfer from said subscriber terminal side SS to said network side NS the inter-arrival time TDIFF of data packets DP and for determining as an active period AP the period from a first data packet DP1 to a last data packet DPn for which each monitored inter-arrival time TDIFF falls in a predetermined range. It should be noted that the inter-arrival time relates to the arrival of the data packets in the transmitter queue and it does not relate to the arrival of data packets at the receiving end.

Furthermore, a physical connection controller includes a physical connection maintaining device LC-MAIN for maintaining the physical connection LC between said subscriber terminal SS side and the network NS in the active period AP determined by the active period detector AP-DET. As shown in FIG. 7, also the network side NS contains an active period detector AP-DET and a physical connection maintaining device LC-MAIN. Since these devices perform the same function in the subscriber terminal side and a network side it should be understood that one of them is sufficient to perform the desired function to maintain the physical connection. However, the devices may be present on both sides if an uplink as well as a downlink is supported in accordance with a further embodiment of the invention to maintain the physical connection as long as possible.

The basic idea of the invention is to maintain the physical connection TBF during active periods in which data packet are generated and arrive at the transmitter queue. For this purpose the active period detector evaluates the successively arriving data packets (i.e. arriving at the transmitter queue) with respect to their inter-arrival time in order to determine whether the successively arriving data packets belong together, for example belong to the same application connected to or incorporated into the subscriber terminal, on the subscriber terminal side, or, on the network side, have been generated by the same application. That is, the maintaining and termination of the physical connection is not governed for example by the fact whether or not the transmitter queue contains data packets but by the fact whether the inter-arrival times are in a predetermined range after the first data packet has been inserted into the transmitter buffer.

Therefore, even if the removal rate of data packets (transmission rate) is higher than the arrival rate of data packets in the transmitter queue TR-QUE, the transmitter queue information setting means CV-SET (on the subscriber terminal side) and FBI-SET (on the network side) can still decide to indicate a non-empty queue if the active period detector indicates a continuation of the active period. Since the transmitter queue information still indicates a non-empty queue, the physical connection is maintained in the active period and no physical connection release procedure is started. Thus, frequent physical connection releases and reestablishments are avoided.

Figure 4A:
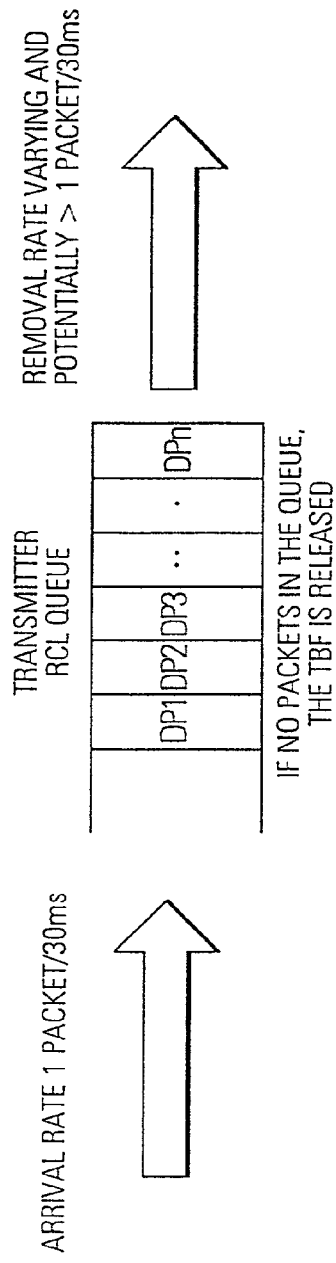
FIG. 4a shows a schematic example of a physical connection handling problem, when the transmitter queue becomes empty.
Figure 4B:
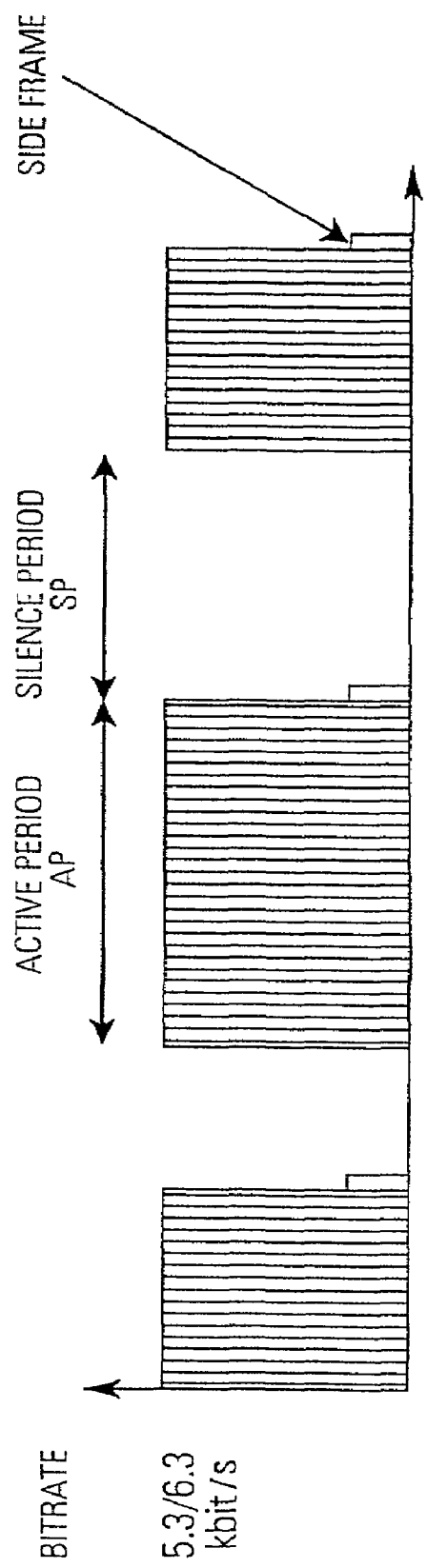
FIG. 4b shows the typical packet data traffic shape according to the G.723.1 speech coder.

Therefore, according to the invention the physical connection is maintained within the complete active period, as shown in FIG. 4b, even if the removal rate of data packets is larger than the arrival-rate of the data packets and therefore the unnecessary physical connection releases within the active period in accordance with the prior art is avoided.

The inventors have discovered that in particular due to the varying transmission rate of data packets transmitted from the transmitter queue based on varying transmission conditions between the subscriber terminal and the network side, there may be a frequent physical connection release even if the data packets arrive at a constant rate as they do for example when being generated by a real-time application. Therefore, the inventors have replaced the criterion for maintaining the physical connection in accordance with the present invention by the detection of an active period of data packet generation which thus avoids the physical connection release and reestablishment when the transmission conditions vary.

Figure 8:
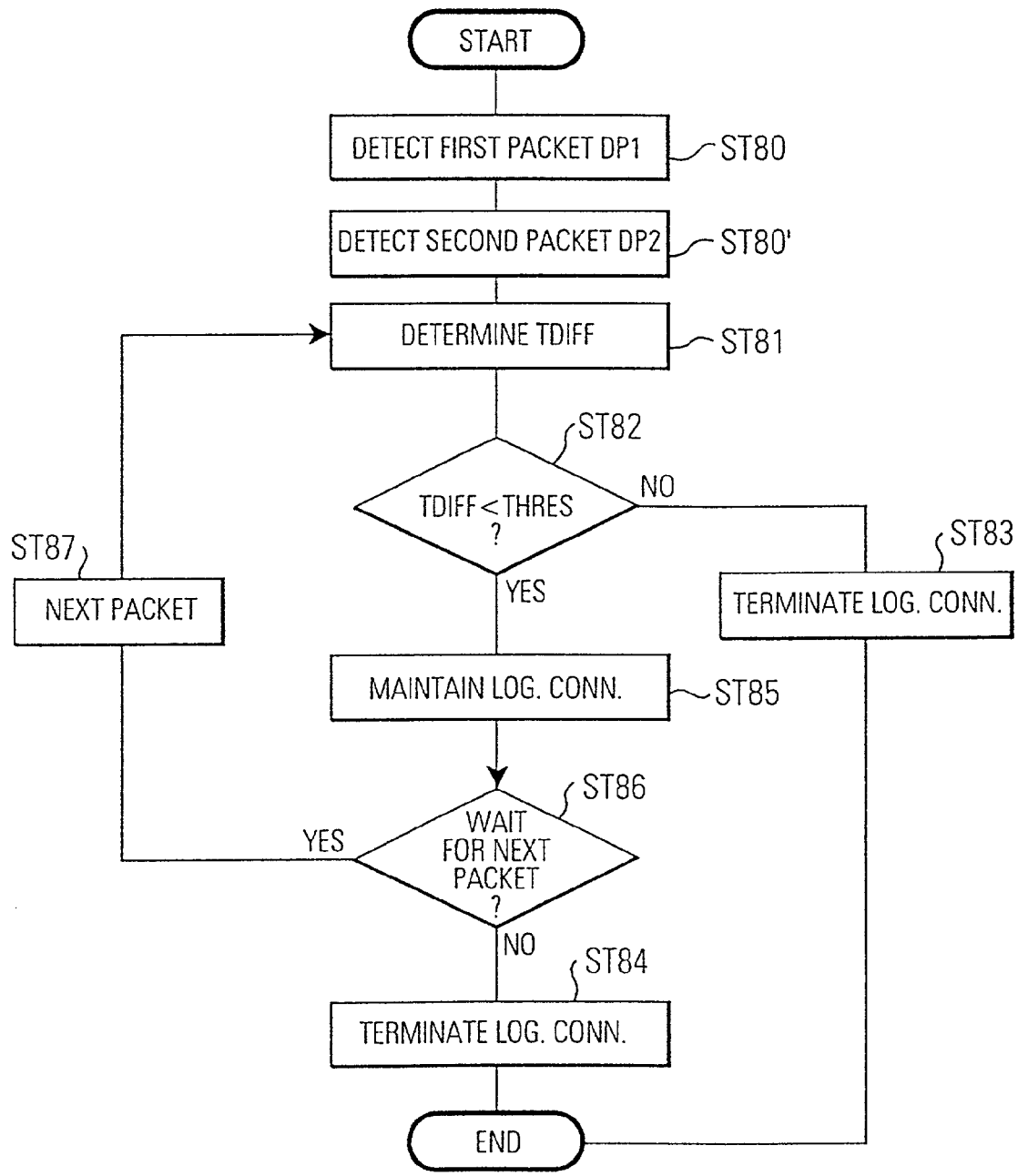
FIG. 8 shows a flowchart according to the principle of the invention.

FIG. 8 shows a flowchart in accordance with the principle of the invention. In step ST80 the transmission detector TDET1 detects the first data packet DP1 generated from an application connected to the subscriber terminal or incorporated into the subscriber terminal. In step ST80' the second packet DP2 is detected. In step ST81 the inter-arrival time TDIFF is determined by the active period detector AP-DET. If it is determined in step ST82 that the inter-arrival TDIFF is smaller than a threshold value THRES, then it is decided in step ST85 to maintain the physical connection. If the inter-arrival time TDIFF is larger than the threshold THRES, then in step ST83 a physical connection terminator LC-TERM of the physical connection controller LC-CTRL terminates the physical connection. In step ST86 a next packet arrival is awaited and if the next packet arrives in step ST87, the inter-arrival time between the second packet and the new (third) packet is determined in step ST81. If again the new inter-arrival time is smaller than the threshold, the physical connection in step ST85 is maintained.

If in step ST86 no further data packets arrive or a silence period is detected (as described below) the physical connection is terminated in step ST84. Therefore, the method according to the principle of the invention shown in FIG. 8 successively goes from one data packet to the next data packet and evaluates as an active period the period from the first data packet to the last data packet for which each monitored inter-arrival time TDIFF falls in a predetermined range (lower than the threshold THRES).

The threshold time THRES determining the predetermined time range can be set to an arbitrary value. Preferably, this time threshold THRES is set to the inverse of typical data packet generation rates of known applications which can be used in the communication system SYS. For example, for a number of speech coders the data packet generation rate is quite well known according to the standard (e.g. according to the G.723.1 standard the data packet generation rate is 1/30 ms). If several applications can be employed having different data packet generation rates, the time threshold THRES is preferably set to the largest possible inter-arrival time.

Preferably, the active period detector AP-DET is further adapted for detecting silence periods SP in which no data packets for data packet transfer are available on the subscriber terminal side or the network side. If a silence period SP is detected, for example step ST86 in FIG. 8, a physical connection terminating device LC-TERM terminates the physical connection LC. One possibility to detect such silence periods is for example if the inter-arrival time exceeds the threshold THRES. Another possibility is that the active period detector detects a silence insertion descriptor SID if the data packet generation device includes in the data packet generation such a silence insertion descriptor SID frame.

Furthermore, instead of explicitly determining the inter-arrival time it is also possible that the active period detector comprises a counter counting the maximum threshold time THRES. This counter is set at the arrival time of a preceding data packet and is reset at the beginning of the next data packet. As long as the counter is reset by a next data packet before it counts the maximum threshold time THRES it can be safely assumed that the data packets belong to the same active period. Therefore, the physical connection is maintained. Therefore, also in this case the physical connection is kept alive even in the case in which the transmitter queue TR-QUE runs out of data packets.

Figure 6:
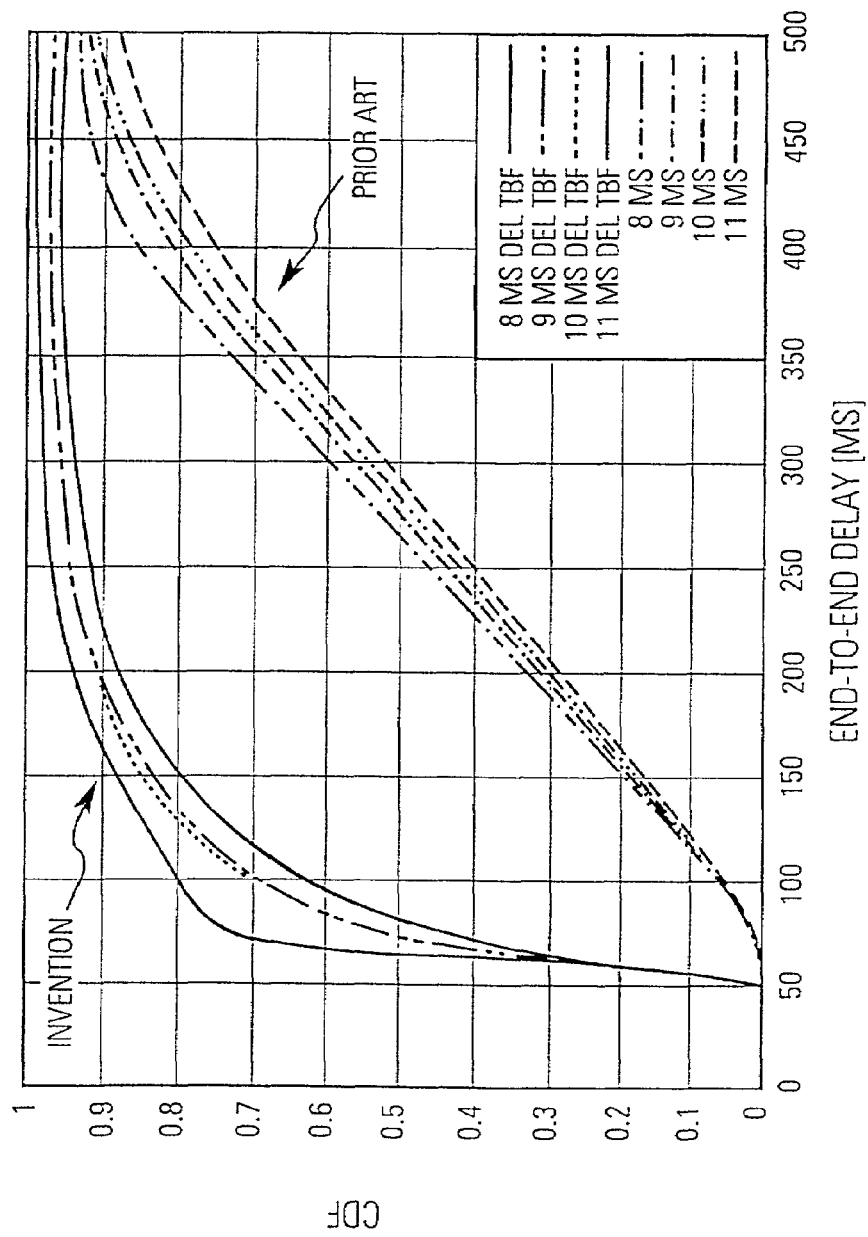
FIG. 6 is a diagram which compares the end-to-end delay time of the invention and the prior art.

In FIG. 6 the curves indicated with "invention" where the physical connection is maintained during the detected active period clearly show that a reduced end-to-end-delay for the data packet transfer is achieved because the physical connection is maintained longer, i.e. the physical connection release is delayed.

Hereinafter, embodiments of the invention will be described illustrating possibilities how a physical connection can be maintained in a detected active period.

FIRST EMBODIMENT (REAL-TIME APPLICATIONS)

Preferably, the active period detector AP-DET can comprise a real-time application data detector RT-DET for detecting whether the data packets DP are real-time data packets. For example, real-time speech/audio applications (e.g. the G.723.1 coder) can be identified by a typically constant arrival rate and a typically constant small packet size. For example, the G.723.1 coder has a constant arrival rate of 1/30 ms and the packets are typically 24 bytes in size. Thus, if a data packet size detector of the active period detector AP-DET determines the size of the data packets successively arriving to be constant and equal, then the active period detector AP-DET detects as active period a period from a first data packet to a last data packet whose sizes are the same. Furthermore, it is even possible to detect a particular real-time application by comparing the determined size of the data packets with previously known and registered sizes, e.g. the G.732.1 coder has a constant size of 24 bytes and thus this type of coder can easily be determined.

The constant arrival rate can be determined by successively comparing the determined inter-arrival times TDIFF as explained with reference to FIG. 8. Again, if it is determined by the active period detector that the determined data packet arrival rate falls within a predetermined rate range, then predetermined real-time applications (e.g. speech/audio coders) can be determined.

As was explained above, the above described applications generating data packets can be incorporated into the subscriber terminal side or the network side. However, if the determination of the arrival rate of data packets for example is incorporated in the network side, e.g. in the base station system BSS, the arrival rate of data packets into the network side transmitter queue TR-QUE may not be constant due to transmission variations between the generator of the data packets and the base transceiver station BTS. If the arrival rate is for example repeatedly evaluated over a certain number of data packets, it is preferable to preset a certain range of arrival rates for which a determination of a "constant" or quasi-constant arrival rate will still be made. That is, to make the determination that the arrival rate is constant, a tolerance can be added to a nominal comparison arrival rate due to the varying transmission conditions between the sender and the base transceiver station BTS on the network side. Thus, also on the network side the arrival rate can be used as a determining criterion for a real-time application.

As explained above, as long as the arrival rate is constant (or constant within a small tolerance) and/or the data packet size is constant, the active period detector continues the detection of an active period AP such that the physical connection maintaining device LC-MAIN further maintains the physical connection (avoids a release). That is, the physical connection termination device LC-TERM will only terminate the physical connection LC if a silence period is detected, e.g. when the arrival rate for the data packet size does not fall within predetermined ranges and/or a silence insertion descriptor SID frame is detected.

SECOND EMBODIMENT (DATA PACKET DELAY)

Figure 4C:
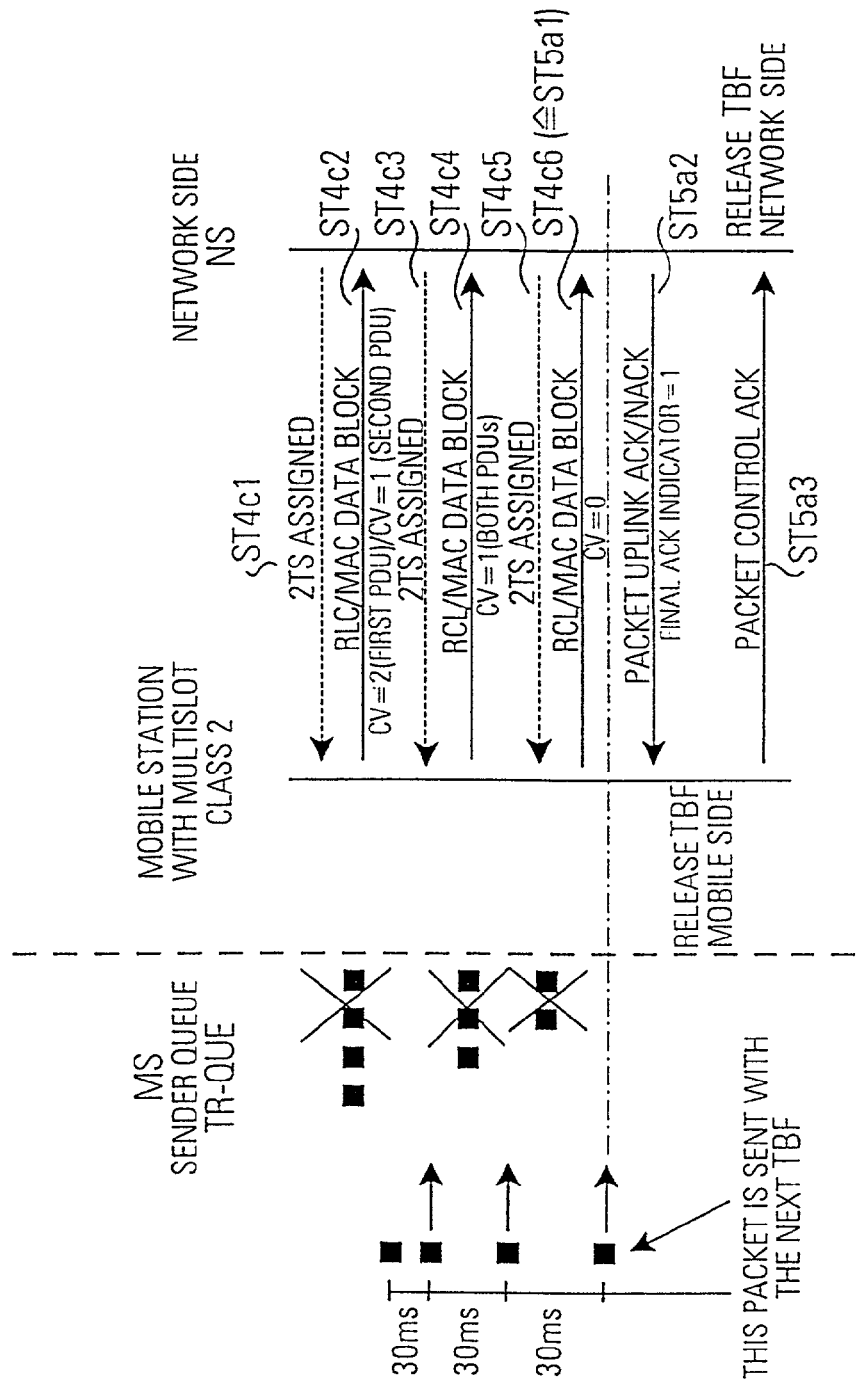
FIG. 4c shows the emptying of a transmitter queue with a static assignment of resources from the network side.

As shown in FIG. 4a and as described with reference to FIG. 4c and the release procedures in FIGS. 5a, 5b, the transmitter queue information setting means CV-SET (or FBI-SET in the network side) always calculates a transmitter queue information CV (or FBI) indicating whether the queue is empty or not. More particularly, on the subscriber terminal side the counter value CV indeed indicates (after a rounding up procedure and dependent on the multislot capability) the remaining data packets in the queue. The physical connection maintaining/terminating devices on the respective receiving side employ these transmitter queue informations to determine whether or not to start a release procedure for the physical connection.

In order to maintain the physical connection (if the active period detector detects the active period) a first possibility is therefore to always transmit a transmitter queue information indicating a non-empty queue to the receiving end, either synchronized to the transmission of the respective data packet or by insertion in the header of the data packet. This will ensure that even if e.g. a current transmission rate from the transmitter queue is larger than the arrival rate, the physical connection is still maintained because the receiving side physical maintaining device does not start the release procedure.

Alternatively, the physical connection maintaining device comprises a data packet transmission delay device DP-DLY for delaying the transmission of a data packet at least for the inter-arrival time TDIFF as monitored by the active period detector AP-DET. If the transmitter queue still contains several data packets, the data packets will be transmitted from the queue "as fast as possible" (or in accordance with other scheduling strategies). However, the last data packet remaining in the queue will be delayed at least for the inter-arrival time as determined on the basis of an evaluation of the preceding data packets. In this case, the transmission rate of the last remaining data packet from the transmitter queue TR-QUE is limited to 1/inter-arrival time. Thus, a condition where the counter value CV (in the subscriber terminal side) or the indicator FBI (on the network side) indicates an empty transmitter queue will never be present since at least one further data packet is kept in the queue at least for the time necessary for a next data packet to arrive in the queue. Since there is never sent an empty queue indication the physical connection is not unnecessarily released.

THIRD EMBODIMENT (DATA PACKET REPETITION)

Figure 9:
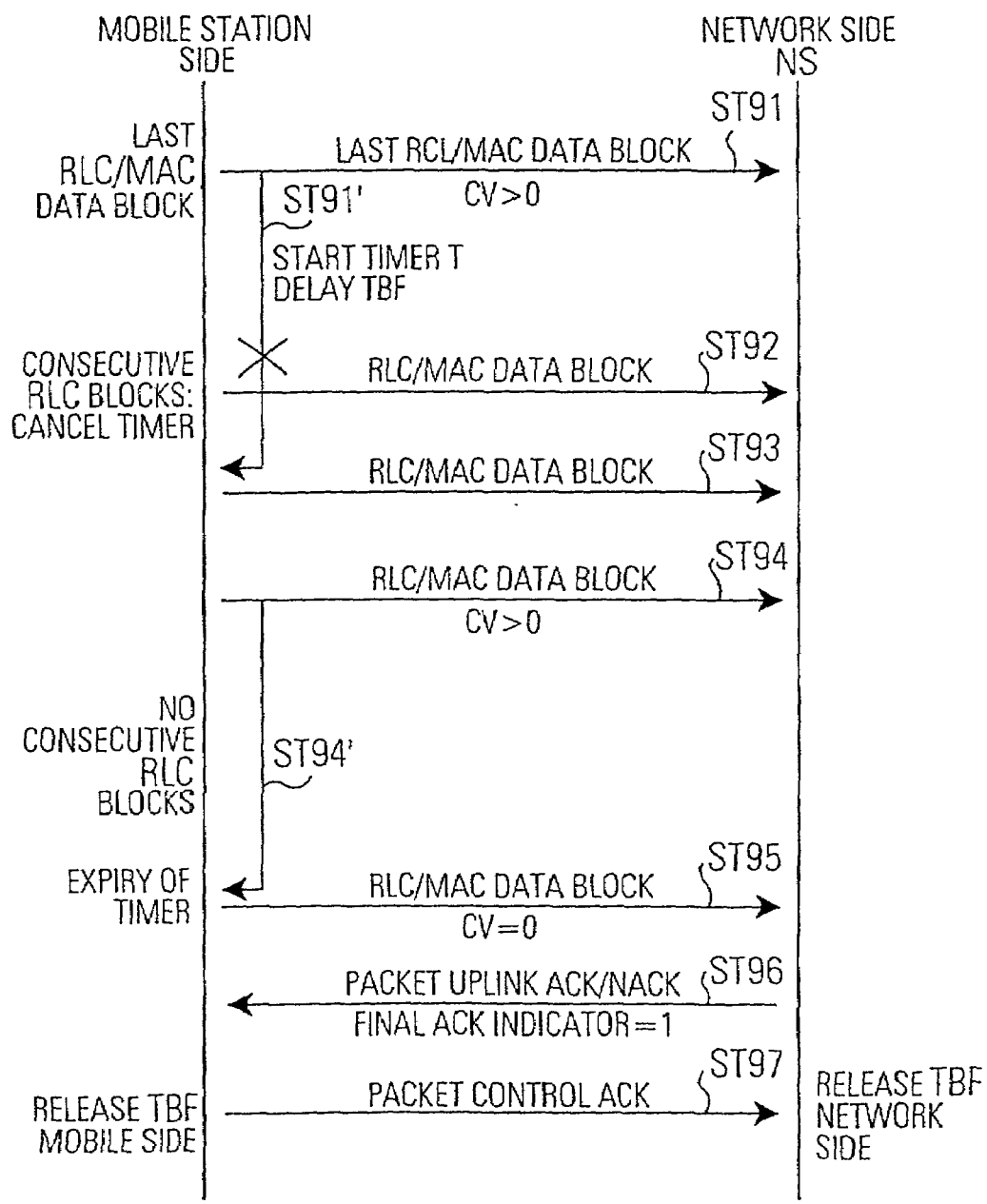
FIG. 9 shows the delay physical connection release in the uplink direction according to an embodiment of the invention.

As explained above, according to the invention an active period is determined on the basis of the inter-arrival time of data packets and the physical connection is maintained within the active period. FIG. 9 shows a flow chart of the method according to a third embodiment of the invention where a delayed physical connection (TBF) release in the uplink direction takes place.

In FIG. 9 it is assumed that before the sending of a data block in step ST91 a last RLC/MAC data block (data packet) is determined by the transmitter queue monitoring device QUE-MON. According to the prior art this last data packet would be transmitted with an empty transmitter queue indication (CV=0). Instead, according to the third embodiment of the invention, this last data block in step ST91 is transmitted together or in association with a transmitter queue information indicating that the transmitter queue is empty (after the transmission of the current data block). That is, as can be seen from step ST91 in FIG. 9, according to the third embodiment of the invention, even if an empty transmitter queue is determined, the counter value indicates a value CV>0, i.e. a data packet is always sent without an indication of an empty transmitter queue.

As also indicated in FIG. 9 (and shown in FIG. 7), the physical connection maintaining device LC-MAIN comprises a subscriber terminal side timer T for counting the inter-arrival time TDIFF when the respective data packet in step ST91 is transmitted. That is, the timer T is started when the data packet is transmitted in step ST91.

If in step ST92 a further data block is present in the transmitter queue, the timer T is reset and the newly entered data block is transmitted in step ST92. Thereafter, in step ST93 further new data packets are transmitted where it is here assumed that indeed the transmitter queue TR-QUE contains further packets.

Again, in step ST94 it is decided that the transmitter queue TR-QUE is empty which leads to a starting of the timer T and to the transmission of a transmitter queue information CV>0 which still indicates a non-empty sender queue despite in fact the sender queue is empty.

Contrary to the time period between step ST91 and step ST92 (where a new data block enters the transmitter queue), after step ST94 the started timer T expires with no further data packet arriving in the transmitter queue. Therefore, if the subscriber terminal side transmitter queue monitoring device QUE-MON does not determine an entry of a new data packet DP in a transmitter queue TR-QUE in the time counted by the timer T, the subscriber terminal side transmitter SS-TR transmits a special packet in step ST95 to the network side, together with a transmitter queue information CV indicating now finally that the transmitter queue TR-QUE is empty. Preferably, the time counted by the timer T corresponds to the last determined inter-arrival time TDIFF.

Since no new data packet has actually entered the transmitter queue between steps ST94, ST95 a special data packet with CV=0 is transmitted. The special data packet can be a copy of the last transmitted data packet or in fact a (dummy) empty data packet.

That is, if no packets enter the queue within a time period similar to the beforehand monitored inter-arrival time, the last transmitted data packet is repeated, but together with an empty sender queue indication at this time. This is the reason why CV=0 is included in step ST95.

Therefore, only if no further data packet enters the transmitter queue in the last determined inter-arrival time, the actual release procedure for the physical connection in the uplink direction is started with step ST95 and continued with steps ST96, ST97 which are identical to the conventional release procedure described above with reference to FIG. 5a.

However, by contrast to FIG. 5a, the uplink release procedure is not started when in fact the transmitter queue TR-QUE first becomes empty before step ST91 and before step ST94, but the release procedure is only started if within the time period counter by the timer T no further data packet arrives. Only in this case it can be simply assumed that the release procedure for the physical connection should be initiated. If a further data packet arrives within the counted time, then no release procedure will be started. This overall leads to a setting of a prolonged active period thus reducing the number of physical connections releases.

Figure 10:
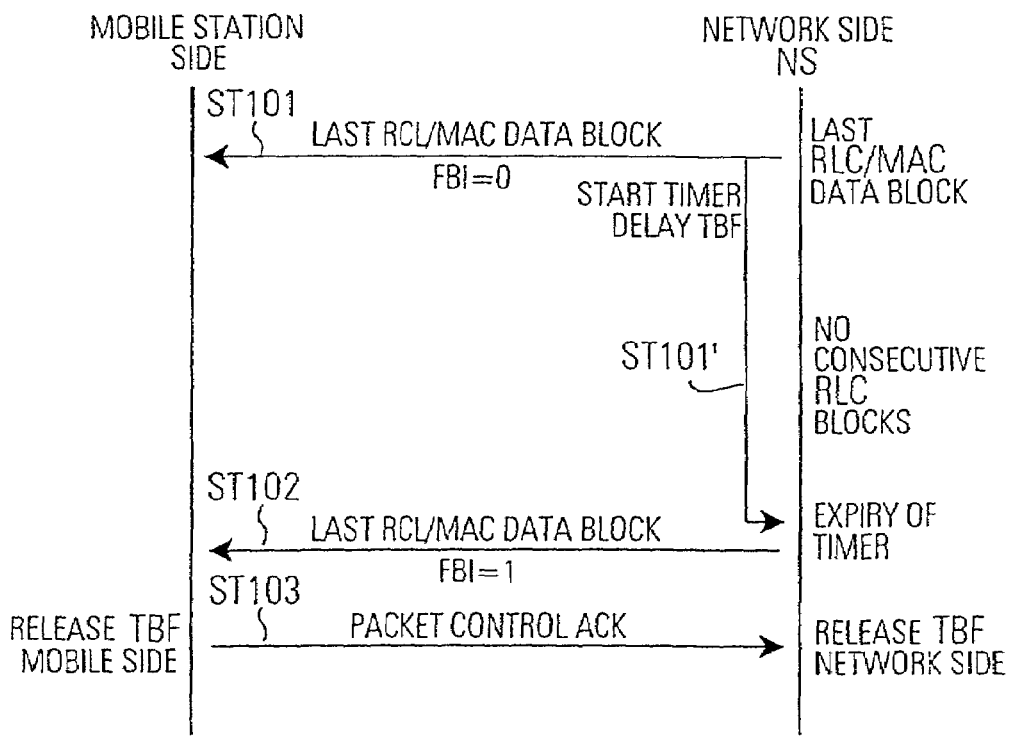
FIG. 10 shows a delayed physical connection release in the downlink direction according to another embodiment of the invention.

FIG. 10 shows a procedure similar to FIG. 9 for the starting of a physical connection release in the downlink direction. In FIG. 10 only the case is illustrated where within the counted time no further data packet arrives (where steps ST101, ST102 correspond to steps ST94, ST95 in FIG. 9). That is, also the network side comprises a timer T as explained before with reference to FIG. 9 and if the network side transmitter queue monitoring device QUE-MON does not determine an entry of a new data packet DP in the transmitter queue TR-QUE in the counted inter-arrival time TDIFF, the network side transmitter SS-TR transmits a special data packet DP to the subscriber terminal side in step ST102. That is, also in FIG. 10 it is assumed that before the transmission of the data packet in step ST101 in fact the transmitter queue TR-QUE in the network side NS is empty, however, as indicated with step ST101 the final block indicator FBI is set to FBI=0 thus indicating a non-empty transmitter queue. Since within the time period counted by the timer T no further data packet arrives, a special data packet is transmitted in step ST102 with the final indication FBI=1 indicating that the transmitter queue TR-QUE is empty.

As indicated in FIG. 9, the special data packet can be a replica of the last transmitted data packet before the transmitter queue in the network side NS became empty. Alternatively, an empty data packet can be sent. In order to allow the repetition of the last sent data packet, a memory is provided in the subscriber terminal side and the network side which always stores at least the last transmitted data packet.

Figure 5B:
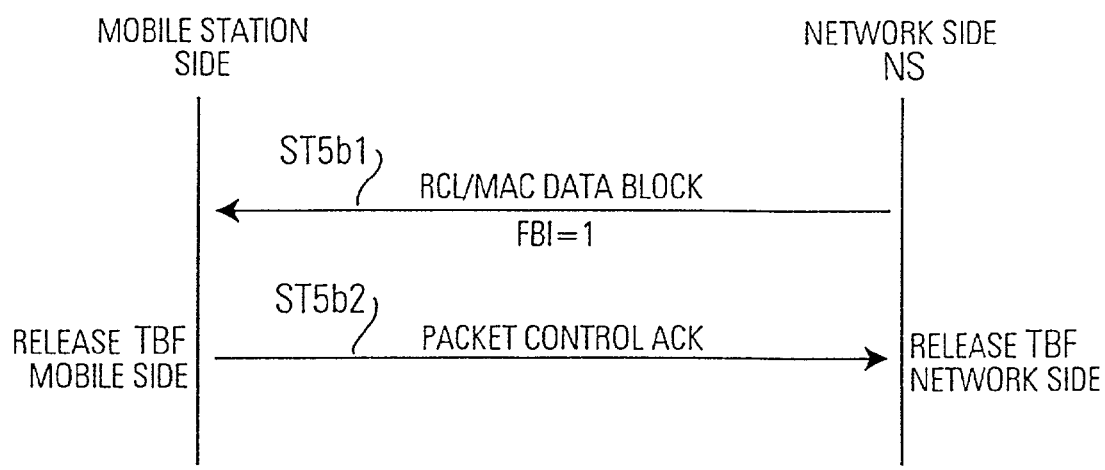
FIG. 5b shows the release procedure of a downlink physical connection according to the prior art.

Again, steps ST102, ST103 in FIG. 10 correspond to the normal release procedure in the downlink direction of the physical connection as illustrated in FIG. 5b such that a detailed description is here omitted.

Figure 11:
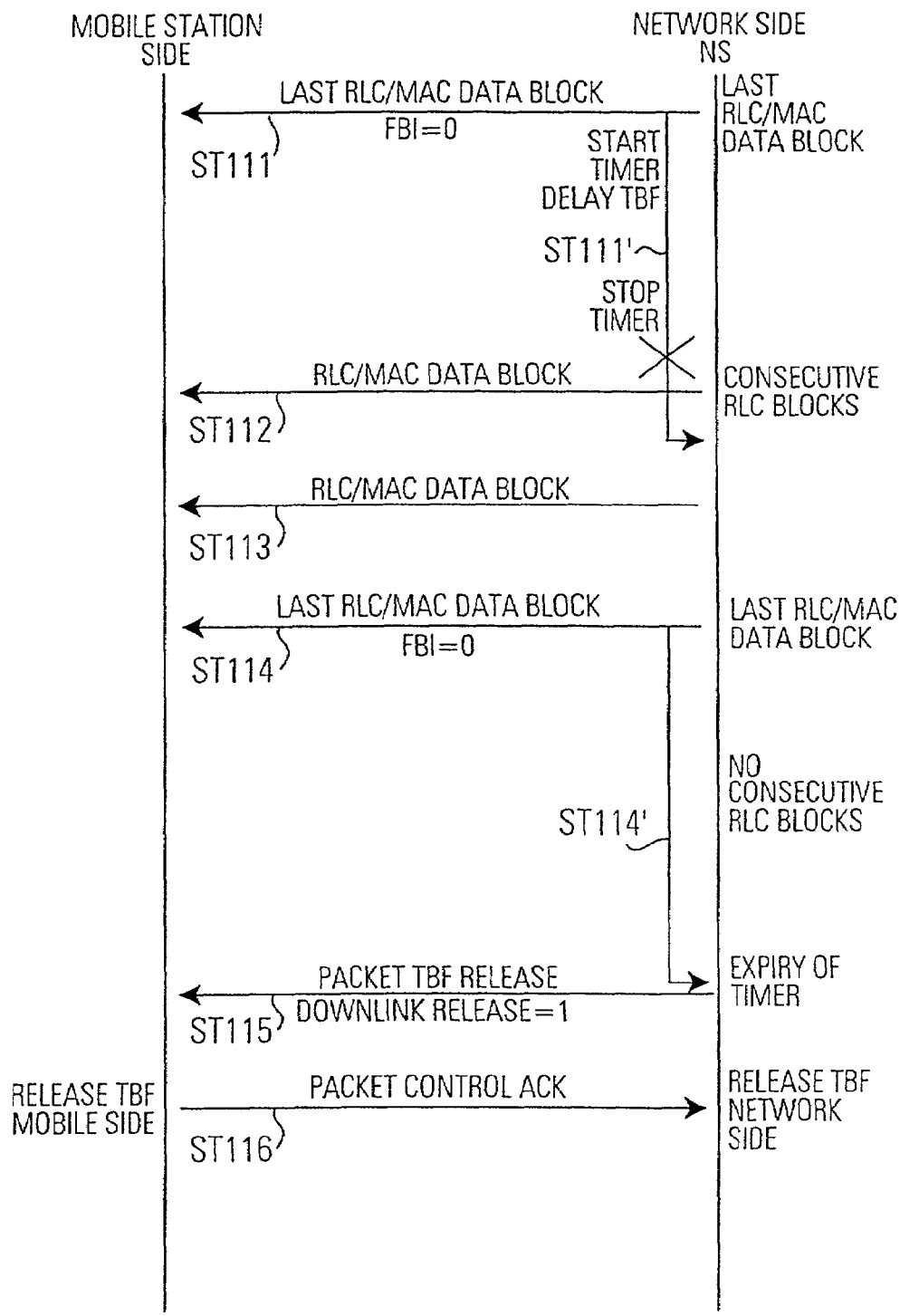
FIG. 11 shows a physical connection termination by utilizing E(GPRS) signalling messages in the downlink direction according to another embodiment of the invention.

FIG. 11 shows a further embodiment of the downlink release of the physical connection. In FIG. 11 steps ST111, ST112 and ST113 correspond to the steps ST91, ST92, ST93 in FIG. 9 with the difference that here the determination of an empty queue and the setting and resetting of the timer T is performed on the network side NS. Step ST114 in FIG. 11 corresponds to step ST101 in FIG. 10.

However, if the network side transmitter queue monitoring means QUE-MON does not determine an entry of a new data packet DP in the network side transmitter queue TR-QUE in the counted inter-arrival time TDIFF, said network side transmitter NS-TR does not transmit a replica of the last transmitted data packet or an empty data packet as in step ST102. Instead, the network side transmitter NS-TR transmits a packet switched signalling message PACKET TBF RELEASE to terminate the physical connection TBF. The message shown in step ST115 is a signalling message to terminate the physical connection utilizing a (E)GPRS system.

However, of course using other packet switched communication systems according to any other standard, different signalling messages can be used for the downlink release of the physical connection in step ST115.

Step ST116 corresponds to step ST103 in FIG. 10. The message "downlink release=1" in step ST115 indicates, as the transmitter queue information FBI=1 in step ST102 in FIG. 10, that the transmitter queue on the network side has finally become empty. However, in the examples shown in FIG. 9, FIG. 10 and FIG. 11 the common aspect is that in fact the active period in which the physical connection is maintained is prolonged since the physical connection release is delayed at least for the inter-arrival time counted by the timer T.

FOURTH EMBODIMENT (INTERRUPTED DOWNLINK RELEASE)

As described above with reference to the first, second and third embodiments, according to the invention an active period can be determined in which a physical connection release is inhibited. This can be done by using the inter-arrival time for determining the active period, for assessing whether a real-time application is present, for delaying the transmission of a data packet, or for delaying the starting of a release procedure. Thus, according to different conditions with respect to the inter-arrival time different active periods can be set in which the physical connection is maintained. All these procedures relate to determinations of active periods before the actual release procedure starts.

Hereinafter, with reference to FIG. 12 it is described how an active period can also be determined when the release procedure has already been started.

Figure 12:
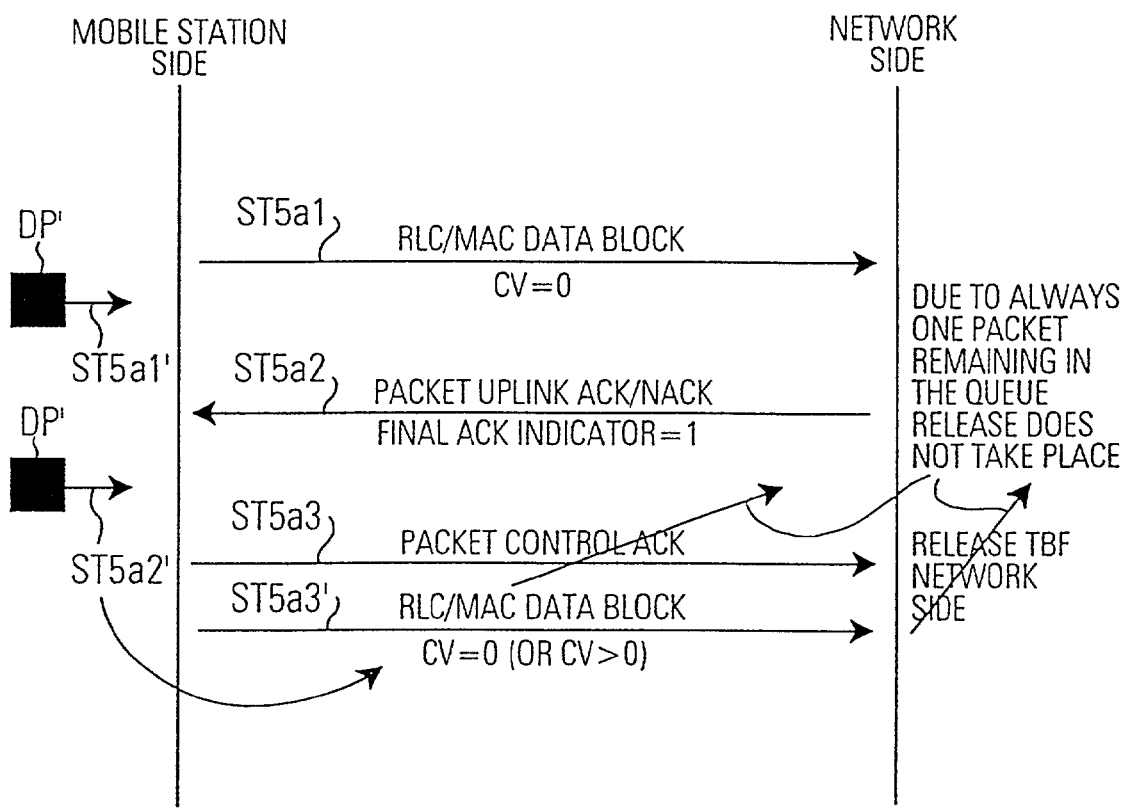
FIG. 12 shows the maintaining of a physical connection by answering a packet uplink acknowledgment/negative acknowledgment message with a data packet for maintaining the physical connection, according to yet another embodiment of the invention.

As can be recognized from a comparison of FIG. 12 with FIG. 5a, in step ST5a1 the uplink release procedure is started by the transmitter queue monitoring means QUE-MON determining an empty transmitter queue which results in the transmission of a data packet and the counter value CV=0 in step ST5a1. In response to this message the network side transmits in step ST5a2 the release acknowledgement message PACKET UPLINK ACK/NACK with the final acknowledgment indicator=1 indicating that the network side has understood that there are no further data packets to be transmitted from the subscriber terminal side. As indicated with step ST5a3 the subscriber terminal side would normally start the release of the physical connection on the mobile side and would then send the packet control acknowledgement message to the network side in step ST5a3.

However, even when the release procedure is already on the way, it can happen, e.g. in step ST5a1' and step ST5a2', that a further data packet DP' enters the transmitter queue TR-QUE on the subscriber terminal side. In this case, the release procedure can be interrupted such that instead of step ST5a3 the newly arrived data block is transmitted to the network side ST5a3' such that the release procedure on the terminal side is not continued. If more than one new data packet DP' has entered the transmitter queue, the counter value CV will be set to CV>0 in which case the network side will not initiate a message as in step ST5a2 even after receipt of the data block in step ST5a3'.

Thus, if a PACKET UPLINK ACK/NACK message with FBI=1 received from the network side (at base station system BSS) is not answered by a PACKET CONTROL ACK MESSAGE to acknowledge the receipt of the physical connection TBF and instead a data packet is sent, the physical connection release procedure is terminated and depending on the counter value CV either the physical connection is maintained or a complete new physical connection release procedure is started.

Thus, by transmitting the new data packet even during the physical connection release the active period in which the physical connection is maintained is extended such that frequent physical connection releases can be avoided.

INDUSTRIAL APPLICABILITY

As explained above, in accordance with the invention the release and re-establishment of physical connections necessary for a packet data transfer in a packet switch communication system can be avoided thus reducing the end-to-end delay.

The particular embodiments described above make reference to the GPRS, EGPRS and GSM standards, however, of course it should be understood that the messages shown in the respective flow charts are by no means limiting the invention to these specific standards. Corresponding physical connections in packet switched communication systems of different standards can be identified and be maintained in accordance with the invention.

Therefore, the invention should not be construed as being limited to the specific embodiments as described here and further embodiments and modifications and variations can be carried out within the teachings of the invention as disclosed in the present specification and claims. Furthermore, the invention can comprise embodiments which consist of features which have been separately described and claimed in the description and the claims. For example, whilst the respective devices for maintaining the physical connections may only be provided on the subscriber terminal side or only on the network side, it is also possible to have the respective devices present simultaneously on the subscriber terminal side and the network side.

Furthermore, it should be noted that the usage of the expressions "mobile station" and "subscriber terminal" are only used to designate any device which generates data packets to be transmitted to the network side, in particular to the base station system or the base transceiver station of the circuit switched network. However, of course any other communication stations can be used instead of the mobile station or a subscriber terminal. Furthermore, it should be understood that the real-time application can be incorporated into the subscriber terminal or mobile station or can be connected to it. Finally, it should be understood that the scope of the invention is by no means limited by the reference numerals in the claims which are only inserted here for illustrations purposes.

The invention claimed is:

1. A subscriber terminal on a subscriber terminal side of a communication system including on a network side a packet data communication system having a base station system, for performing a user packet data transfer between said subscriber terminal side and said base station system on said network side, comprising:
   a radio communication link between said base station system on said network side and said subscriber terminal side;
   radio resources for facilitating said user data packet transfer on said radio communication link;
   a physical connection controller for performing said user data packet transfer on said radio communication link between said base station system and said subscriber terminal side by scheduling said user data packets as a number of radio blocks on said radio resources on said radio communication link,
   said physical connection indicating in the subscriber terminal side and the network side that the subscriber terminal side and the network side are included in a radio resources scheduling process for performing said user data packet transfer;
   a transmission buffer comprising a subscriber terminal side transmission queue wherein said user data packets enter said transmission queue with respective inter-arrival times;
   a transmission detector including an active period detector for monitoring, for the user data packet transfer between said network side and said subscriber terminal side, the inter-arrival time of user data packets into said transmission queue by respectively detecting the user data packets arriving into the transmission queue and determining as inter-arrival time respectively the time between two detected user data packets and for determining as an active period the period from a first detected user data packet to a last detected user data packet for which each determined inter-arrival time falls in a predetermined range; and
   wherein said physical connection controller further includes a physical connection maintaining device to maintain said physical connection between said subscriber terminal side and said network side in said active period.

2. A subscriber terminal according to claim 1, wherein:
   said active period detector detects silence periods in which no data packets for data packet transfer are available on said subscriber terminal side; and
   said physical connection controller includes a physical connection terminator for terminating said physical connection during said silence periods detected by said active period detector.

3. A subscriber terminal according to claim 1, wherein said active period detector comprises a real-time application data detector for detecting whether said data packets are real-time data packets.

4. A subscriber terminal according to claim 1, wherein said physical connection maintaining device for maintaining said physical connection between said subscriber terminal side and said network side in said active period comprises a data packet transmission delay device for delaying the transmission of a data packet at least for the inter-arrival time as monitored by said active period detector.

5. A subscriber terminal according to claim 1, wherein:
   said subscriber terminal side transmitter queue from which data packets are successively transmitted to the network side;
   a subscriber terminal side transmitter queue monitoring device for determining whether the transmitter queue comprises data packets to be transmitted;
   a subscriber terminal side transmitter queue information setting means for determining, on the basis of the determination made by said transmitter queue monitoring means, a transmitter queue information indicating whether the transmitter queue is empty (CV=0) or whether the transmitter queue contains at least one data packet to be transmitted to the network side (CV>0); and
   a subscriber terminal side transmitter for transmitting to said network side data packets from the transmitter queue and for transmitting in association with a respective data packet said transmitter queue information.

6. A subscriber terminal according to claim 5, wherein:
   said physical connection maintaining device comprises a subscriber terminal side timer for counting the inter-arrival time when a respective data packet is transmitted;
   if said subscriber terminal side transmitter queue monitoring device does not determine an entry of a new data packet in the transmitter queue in said counted inter-arrival time, said subscriber terminal side transmitter transmits a special data packet to the network side and in association therewith a transmitter queue information indicating that the transmitter queue is empty.

7. A subscriber terminal according to claim 6, wherein said special data packet is the last transmitted data packet or a dummy data packet.

8. A subscriber terminal according to claim 5, further comprising an uplink release acknowledgement message detector for determining the receipt of an uplink release acknowledgement message transmitted from the network side in response to receiving a transmitter queue information (CV=0) indicating that the transmitter queue is empty; and wherein if said subscriber terminal transmitter queue monitoring means detects a new entry of data packet in said transmitter queue after said subscriber terminal transmitter has transmitted a transmitter queue information (CV=0) indicating that the transmitter queue is empty, an uplink release acknowledgement message detected by said uplink release acknowledgement message detector is not answered by transmitting an uplink release confirmation message but by transmitting said new data packet by said subscriber terminal transmitter for maintaining said physical connection.

9. A subscriber terminal according to one or more claim 8, wherein said transmitter queue information is transmitted in a respective data packet.

10. A communication system for performing packet data transfer on a connection between the subscriber terminal side and a network side, wherein during a data packet transfer a physical connection is maintained which indicates in the subscriber terminal and the network side that the subscriber terminal and the network side are capable of performing said packet data transfer, comprising at least one subscriber terminal comprising:
- a radio communication link between said base station system on said network side and said subscriber terminal side;
- radio resources for facilitating said user data packet transfer on said radio communication link;
- a physical connection controller for performing said user data packet transfer on said radio communication link between said base station system and said subscriber terminal side by scheduling said user data packets as a number of radio blocks on said radio resources on said radio communication link,
- said physical connection indicating in the subscriber terminal side and the network side that the subscriber terminal side and the network side are included in a radio resources scheduling process for performing said user data packet transfer;
- a transmission buffer comprising a subscriber terminal side transmission queue wherein said user data packets enter said transmission queue with respective inter-arrival times;
- a transmission detector including an active period detector for monitoring for the user data packet transfer between said network side and said subscriber terminal side, the inter-arrival time of user data packets into said transmission queue by respectively detecting the user data packets arriving into the transmission queue and determining as inter-arrival time respectively the time between two detected user data packets and for
- determining as an active period the period from a first detected user data packet to a last detected user data packet for which each determined inter-arrival time falls in a predetermined range; and
- wherein said physical connection controller further includes a physical connection maintaining device to maintain said physical connection between said subscriber terminal side and said network side in said active period.

11. A network controller on a network-side of a communication system including on said network side a packet data communication system having a base station system, for performing a user packet data transfer between said base station system on said network side and a subscriber terminal side, comprising:
- a radio communication link between said base station system on said network side and said subscriber terminal side;
- radio resources for facilitating said user data packet transfer on said radio communication link;
- a physical connection controller for performing said user data packet transfer, on said radio communication link between said base station system and said subscriber terminal side by scheduling said user data packets as a number of radio blocks on said radio resources on said radio communication link,
- said physical connection indicating in the subscriber terminal side and the network side that the subscriber terminal side and the network side are included in a radio resources scheduling process for performing said user data packet transfer;
- a transmission buffer comprising a network side transmission queue wherein said user data packets enter said transmission queue with respective inter-arrival times,
- a transmission detector including an active period detector for monitoring, for the user data packet transfer between said network side and said subscriber terminal side, the inter-arrival time of user data packets into said transmission queue by respectively detecting the user data packets arriving into the transmission queue and determining as interarrival time respectively the time between two detected user data packets and
- for determining as an active period the period from a first detected user data packet to a last detected user data packet for which each determined inter-arrival time falls in a predetermined range; and
- wherein said physical connection controller further comprises a physical connection maintaining device to maintain said physical connection between said subscriber terminal side and said network side in said active period.

12. A network controller according to claim 11, wherein:
- said active period detector detects silence periods in which no data packets for data packet transfer are available on said network side; and
- said physical connection controller includes a physical connection terminator for terminating said physical connection during said silence periods detected by said active period detector.

13. A network controller according to claim 11, wherein said active period detector comprises a real-time application data detector for detecting whether said data packets to be transmitted from said network side are real-time data packets.

14. A network controller according to one or more of claims 11, wherein said physical connection maintaining device for maintaining said physical connection between said subscriber terminal side and said network side in said active period comprises a data packet transmission delay device for delaying the transmission of a data packet at least for the inter-arrival time as monitored by said active period detector.

15. A network controller according to claim 11, further comprising:
- said network side transmitter queue from which data packets are successively transmitted to the subscriber terminal side;

a network side transmitter queue monitoring device for determining whether the transmitter queue comprises data packets to be transmitted;

a network side transmitter queue information setting means for determining, on the basis of the determination made by said transmitter queue monitoring means, a transmitter queue information indicating whether the transmitter queue is empty or whether the transmitter queue contains at least one data packet to be transmitted to the subscriber terminal side; and a network side transmitter for transmitting to said subscriber terminal side data packets from the transmitter queue and for transmitting in association with a respective data packet said transmitter queue information.

16. A network controller according to claim 15, wherein:

said physical connection maintaining device comprises a network side timer for counting the inter-arrival time when a respective data packet is transmitted;

if said network side transmitter queue monitoring device does not determine an entry of a new data packet in the transmitter queue in said counted inter-arrival time, said network side transmitter transmits a special data packet to the subscriber terminal side and in association therewith a transmitter queue information indicating that the transmitter queue is empty.

17. A network controller according to claim 16, wherein said special data packet is the last transmitted data packet or a dummy data packet.

18. A network controller according to claim 15, wherein:

said physical connection maintaining device comprises a network side timer for counting the inter-arrival time when a respective data packet is transmitted;

if said network side transmitter queue monitoring device does not determine an entry of a new data packet in the transmitter queue in said counted inter-arrival time, said network side transmitter transmits a packet switched signalling message to the subscriber terminal side and in association therewith a transmitter queue information indicating that the transmitter queue is empty.

19. A network controller according to claim 15, wherein said transmitter queue information is transmitted in a respective data packet.

20. A communication system for performing packet data transfer on a connection between the subscriber terminal side and a network side, wherein during a data packet transfer a physical connection is maintained which indicates in the subscriber terminal and the network side that the subscriber terminal and the network side are capable of performing said packet data transfer, comprising at least one network controller comprising:

a radio communication link between said base station system on said network side and said subscriber terminal side;

radio resources for facilitating said user data packet transfer on said radio communication link;

a physical connection controller for performing said user data packet transfer, on said radio communication link between said base station system and said subscriber terminal side by scheduling said user data packets as a number of radio blocks on said radio resources on said radio communication link, said physical connection indicating in the subscriber terminal side and the network side that the subscriber terminal side and the network side are included in a radio resources scheduling process for performing said user data packet transfer;

a transmission buffer comprising a network side transmission queue wherein said user data packets enter said transmission queue with respective inter-arrival times, a transmission detector including an active period detector for monitoring, for the user data packet transfer between said network side and said subscriber terminal side, the inter-arrival time of user data packets into said transmission queue by respectively detecting the user data packets arriving into the transmission queue and determining as interarrival time respectively the time between two detected user data packets and for determining as an active period the period from a first detected user data packet to a last detected user data packet for which each determined inter-arrival time falls in a predetermined range; and wherein said physical connection controller further comprises a physical connection maintaining device to maintain said physical connection between said subscriber terminal side and said network side in said active period.

21. A method for transferring user data packets between a network side and a subscriber terminal side of a communication system having a base station system, the method comprising:

providing a radio communication link between said base station system on said network side and said subscriber terminal side;

providing radio resources to be used for said user data packet transfer, on said radio communication link;

a3) providing a physical connection for performing said user data packet transfer on said radio communication link between said base station system and said subscriber terminal side by scheduling said user data packets as a number of radio blocks on said radio resources on said radio communication link, said physical connection indicating in the subscriber terminal side and the network side that the subscriber terminal side and the network side are included in a radio resources scheduling process for performing said user data packet transfer;

providing a transmission buffer containing a subscriber terminal side transmission queue wherein said user data packets enter said transmission queue with respective inter-arrival times;

monitoring, for a user data packet transfer between said network side and said subscriber terminal side, the inter-arrival time of user data packets into said transmission queue by respectively detecting the user data packets arriving into the transmission queue and determining as inter-arrival time respectively the time between two detected user data packets; and determining as an active period the period from a first detected user data packet to a last detected user data packet for which each determined inter-arrival time falls in a predetermined range; and maintaining said physical connection between said subscriber terminal side and said network side in said active period.

22. A method according to claim 21, further comprising:

detecting silence periods in which no data packets for data packet transfer are available on said subscriber terminal side; and terminating said physical connection during said silence periods.

23. A method according to claim 21, further comprising detecting whether said data packets are real-time data packets.

24. A method according to claim 21, further comprising delaying the transmission of a data packet at least for the inter-arrival time as monitored by said active period detector.

25. A method according to claim 21, further comprising:
transmitting data packets from a transmitter queue;
determining whether the transmitter queue comprises data packets to be transmitted;
determining a transmitter queue information indicating whether the transmitter queue is empty (CV=0) or whether the transmitter queue contains at least one data packet to be transmitted to the network side (CV>0); and
transmitting data packets from the transmitter queue and in association with a respective data packet said transmitter queue information.

26. A method according to claim 25, further comprising:
counting the inter-arrival time when a respective data packet is transmitted; and
wherein if an entry of a new data packet into the transmitter queue is not determined in said counted inter-arrival time, transmitting a special data packet from the network side and in association therewith a transmitter queue information indicating that the transmitter queue is empty.

27. A method according to claim 26, further comprising transmitting as said special data packet the last transmitted data packet or a dummy data packet.

28. A method according to claim 25, further comprising:
receiving on the network side a transmitter queue information (CV=0) indicating that the transmitter queue is empty;
transmitting an uplink release acknowledgement message from the network side to the subscriber terminal side;
determining in the subscriber terminal side the receipt of said uplink release acknowledgement message;
if a new entry of data packet in said transmitter queue is detected after said subscriber terminal transmitter has transmitted a transmitter queue information (CV=0) indicating that the transmitter queue is empty, said subscriber terminal does not answer the uplink release acknowledgement message by transmitting an uplink release confirmation message but by transmitting said new data packet for maintaining said physical connection.

29. A method according to one or more claim 21, wherein said transmitter queue information is transmitted in a respective data packet.

30. A method according to claim 25, further comprising counting the inter-arrival time when a respective data packet is transmitted; and wherein if an entry of a new data packet into the transmitter queue is not determined in said counted inter-arrival time, transmitting a signalling message from the network side and in association therewith a transmitter queue information indicating that the transmitter queue is empty.

* * * * *